US011590706B2

(12) United States Patent
Dias et al.

(10) Patent No.: US 11,590,706 B2
(45) Date of Patent: Feb. 28, 2023

(54) METHODS OF POST-PROCESSING PHOTOFABRICATED ARTICLES CREATED VIA ADDITIVE FABRICATION

(71) Applicant: Covestro (Netherlands) B.V., Nieuwegein (NL)

(72) Inventors: Aylvin Jorge Angelo Athanasius Dias, Echt (NL); Franciscus Johannes Marie Derks, Echt (NL)

(73) Assignee: Covestro (Netherlands) B.V., Geleen (NL)

( * ) Notice: Subject to any disclaimer, the term of this patent is extended or adjusted under 35 U.S.C. 154(b) by 72 days.

(21) Appl. No.: 17/052,213

(22) PCT Filed: May 3, 2019

(86) PCT No.: PCT/NL2019/050266
§ 371 (c)(1),
(2) Date: Nov. 2, 2020

(87) PCT Pub. No.: WO2019/212353
PCT Pub. Date: Nov. 7, 2019

(65) Prior Publication Data
US 2021/0323233 A1    Oct. 21, 2021

(30) Foreign Application Priority Data

May 3, 2018  (EP) .................................... 18170539

(51) Int. Cl.
| | |
|---|---|
| *B29C 64/35* | (2017.01) |
| *B33Y 10/00* | (2015.01) |
| *B33Y 70/00* | (2020.01) |
| *B29C 64/124* | (2017.01) |
| *B33Y 40/20* | (2020.01) |

(52) U.S. Cl.
CPC ............ *B29C 64/35* (2017.08); *B29C 64/124* (2017.08); *B33Y 10/00* (2014.12); *B33Y 40/20* (2020.01); *B33Y 70/00* (2014.12)

(58) Field of Classification Search
CPC .................. B29C 64/35; B29C 64/124; B29C 2035/0827; B29C 2071/0027; B29C 2071/0045; B29C 71/02; B29C 71/04; B29C 71/0009; B29C 64/106; B29C 35/02; B29C 64/386; B29C 71/00; B29C 2071/0026; B33Y 10/00; B33Y 40/20; B33Y 70/00; B33Y 40/00; B33Y 80/00; G06F 30/00
See application file for complete search history.

(56) References Cited

U.S. PATENT DOCUMENTS

| | | |
|---|---|---|
| 5,248,456 A | 9/1993 | Evans, Jr. |
| 5,665,792 A | 9/1997 | Lawton |
| 8,678,805 B2 | 3/2014 | Vermeer |
| 8,765,045 B2 | 7/2014 | Zinniel |
| 9,228,073 B2 | 1/2016 | He |
| 9,676,899 B2 | 6/2017 | Steeman |
| 9,708,442 B1 | 7/2017 | Kwisnek |
| 10,343,331 B2 * | 7/2019 | McCall ................... B29C 64/40 |
| 11,008,479 B2 * | 5/2021 | Olubummo ........... B29C 64/165 |
| 2009/0093564 A1 | 4/2009 | Oyanagi |
| 2009/0208872 A1 | 8/2009 | Wolf |
| 2011/0186081 A1 | 8/2011 | Dunn |
| 2012/0142793 A1 | 6/2012 | Frey |
| 2016/0221269 A1 * | 8/2016 | Okamoto ................ B22F 10/10 |
| 2016/0333153 A1 * | 11/2016 | Hirata ...................... C08J 3/005 |
| 2017/0173872 A1 | 6/2017 | McCall et al. |
| 2017/0240659 A1 | 8/2017 | Norcini |
| 2018/0009975 A1 | 1/2018 | Farrugia |
| 2018/0050495 A1 * | 2/2018 | Stolyarov ................... C08J 5/04 |
| 2020/0001536 A1 * | 1/2020 | DeSimone ............ B29C 64/188 |
| 2020/0338638 A1 * | 10/2020 | Bär ........................ B22F 12/00 |
| 2021/0023780 A1 * | 1/2021 | Price ...................... B33Y 80/00 |
| 2021/0362240 A1 * | 11/2021 | Shaarawi ............. C09D 11/106 |

FOREIGN PATENT DOCUMENTS

| | | |
|---|---|---|
| CN | 104570603 A | 4/2015 |
| CN | 104892549 A | 9/2015 |
| CN | 105713332 A | 6/2016 |
| WO | 2017029657 | 2/2017 |
| WO | WO-2017029657 A1 * | 2/2017 ............. B29C 35/08 |

OTHER PUBLICATIONS

International Search Report dated Oct. 18, 2019.

* cited by examiner

*Primary Examiner* — Nahida Sultana
(74) *Attorney, Agent, or Firm* — Jed C. Benson

(57) ABSTRACT

Methods for post-processing photofabricated articles created via additive fabrication processes are described and claimed herein. Such methods include providing a photofabricated article, preferably an article that has been at least partially cured via cationic polymerization mechanisms, optionally, post-processing the photofabricated article, and base-washing the photofabricated article in an alkaline solution or dispersion to create a neutralized photofabricated article. In another embodiment, the methods include treating a photofabricated article having a residual acid or base species with a treatment composition in order to create a neutralized photofabricated article. Also described and claimed are the neutralized photofabricated articles created via the methods herein elsewhere described. Such articles are preferably biocompatible, especially as determined by their lack of cytotoxicity potential.

23 Claims, No Drawings

METHODS OF POST-PROCESSING PHOTOFABRICATED ARTICLES CREATED VIA ADDITIVE FABRICATION

TECHNICAL FIELD

The present invention relates to methods of post-processing photofabricated articles created via additive fabrication processes, and the articles processed thereby. The present invention also relates to the preparation of articles photofabricated via additive fabrication processes from compositions capable of undergoing cationic polymerization for applications requiring biocompatibility.

CROSS-REFERENCE TO RELATED APPLICATIONS

This application claims priority to European patent application number EP18170539.3, filed 3 May 2019, the entire contents of which is hereby incorporated by reference in its entirety as if fully set forth herein.

BACKGROUND

Additive fabrication techniques are suitable for the creation of objects which may be utilized in a variety of end-uses and applications. Additive fabrication processes utilize computer-aided design (CAD) data of an object to build three-dimensional parts. These three-dimensional parts may be formed from liquid resins, solid filaments, powders, or other materials.

A well-known, non-limiting example of an additive fabrication process is stereolithography (SL). Stereolithography is a process for rapidly producing models, prototypes, patterns, and production parts in certain applications. SL uses CAD data of an object wherein the data is transformed into thin cross-sections of a three-dimensional object. The data is loaded into a computer which controls a source of electromagnetic radiation that traces or images a pattern of a cross section through a liquid radiation curable resin composition contained in a vat, solidifying a thin layer of the resin corresponding to the cross section. The electromagnetic radiation may be UV, visible, or infrared light and may be applied by, for example, lasers, lamps, or LEDs. The electromagnetic radiation may be applied selectively, e.g. by drawing a specific pattern with a laser, or by mask imaging via digital micromirror devices (DMD), or unselectively, e.g. by passing a lamp over the entirety of a surface. The solidified layer is recoated with resin and the source of electromagnetic radiation exposes another cross section to harden another layer of resin on top of the previous layer. The process is repeated layer by layer until the three-dimensional object is completed. When initially formed, the three-dimensional object often is not fully cured, and may be referred to as a "green model."

In order to more-fully cure the green model, and to impart improved physical performance characteristics into the finished three-dimensional object, one or more post-processing techniques are often applied. These techniques include the application of additional actinic radiation in a UV-postcure apparatus, as well as the application of additional thermal energy in a thermal postcuring apparatus.

Additive fabrication techniques are particularly attractive for forming objects to be used in many medical and/or dental applications, because such applications require the creation of custom articles with varying geometry that conform to the unique anatomy of each individual patient or subject. As many medical and/or dental applications require that the three-dimensional article comes into direct or indirect (such as the case wherein the three-dimensional article is used as a mold for forming an implantable medical device or dental aligner) contact with a patient's skin or bodily fluids, such components must possess certain degrees of biocompatibility.

Biocompatible materials suitable for use in additive manufacturing processes are known. Different materials, formed from a variety of additive fabrication processes may be used. Generally, thermoplastic materials are used in, for example fused filament fabrication (FFF) and selective laser sintering (SLS) processes, whereas thermoset materials are used in, for example vat-based processes and processes that involve jetting of liquid materials.

For applications requiring a high degree of accuracy and precision in the solid article, or for those demanding high structural integrity of the object, photopolymers may be used. Photopolymers are thermosetting materials which initiate and propagate polymerization, whether directly or indirectly, upon exposure to actinic radiation of a specific wavelength and dose. The photo-polymerization process irreversibly converts the liquid photopolymer into a "cured" object via chemical crosslinking. The chemical bonds between and amongst polymer chains results in the creation of the solid three-dimensional article.

Amongst photopolymer materials, so-called hybrid systems are well-known, and are described in, i.a., U.S. Pat. Nos. 9,228,073 and 9,708,442. Hybrid systems, which include chemical constituents which are capable of undergoing polymerization via two mechanisms—free-radical and cationic polymerization—include a cationically curable component and a free-radically curable component. Such components involve monomers, oligomers, or polymers that undergo their respective form of polymerization when acted upon or facilitated by photoactive species generated by corresponding cationic and free-radical initiators. Hybrid systems provide several advantages in that they are known to facilitate the production of three-dimensional cured parts which possess a very high dimensional fidelity with respect to the "ideal" virtual CAD object that dictates the actions of the additive fabrication apparatus itself. They ensure fidelity by tending to limit or withstand the amount of differential shrinkage, curl, or deformation imparted into the three-dimensional solid object that otherwise is known to occur in photopolymer systems having different chemistries (such as all acrylate or methacrylate-based photopolymer compositions). Hybrid-curable systems also are capable of producing objects with superior mechanical properties, such as those with improved stiffness, heat-resistance, chemical resistance, or toughness.

One drawback of hybrid systems, however, is their lack of ready biocompatibility when compared to other photopolymer systems, such as purely free-radically polymerizable systems including (meth)acrylate-based compositions. Although a small number of hybrid-curable photopolymer materials exist which are suitable for use in select medical or dental industry applications, it would be desirable to provide a technique for more effectively and efficiently post-processing the cured parts made therefrom to ensure improved biocompatibility in terms of superior and more consistent cytotoxicity testing performance.

BRIEF SUMMARY

Described herein are several embodiments of the invention which prescribe techniques for solving the problems heretofore identified. According to a first aspect, the invention employs a method of post-treating a solid photofabricated article created via an additive fabrication process, the method comprising the steps of (1) providing a solid photofabricated article that was created by an additive fabrication process via the curing of a composition capable of undergoing cationic polymerization, (2) postprocessing said solid photofabricated article, and (3) base-washing said photofabricated article in an alkaline solution or dispersion, thereby creating a neutralized photofabricated article, wherein said solid photofabricated article is the cured product of a radiation curable composition that is capable of undergoing cationic and free-radical polymerization, wherein said cationic and free-radical polymerization is performed simultaneously or sequentially. In an embodiment, the method involves a sterilization step of the neutralized photofabricated article. In another embodiment, the method further includes optional cleaning steps, which may occur prior to one or both of the steps of post-processing and/or sterilizing. In an embodiment, the alkaline solution or dispersion possesses specified pH values and includes a neutralizing agent. According to various further embodiments, the base-washing step occurs according to prescribed times, temperatures, and ratios of alkaline solution or dispersion to photofabricated article, ratios between the maximum generable amount of photoacids to the quantity of neutralizing agent, and with respect to photofabricated articles of varying surface area to volume ratios. In yet other embodiments, various specific compositions from which the solid photofabricated article used in the methods according to the invention was polymerized are described.

The present invention also includes a second aspect describing a method comprising the steps of providing a photofabricated object created via an additive fabrication process, said photofabricated object possessing a residual quantity of an acid or a base; and treating said photofabricated object with a treatment composition possessing a pH and comprising a neutralizing agent to form a neutralized photofabricated object; wherein said neutralizing agent is configured to neutralize at least a portion of the residual quantity of the acid or base. In an embodiment according to the second aspect of the invention, the neutralizing agent is selected with a pH that is on the opposite side of 7.0 relative to the pH of a chosen residual acid or base in the photofabricated article.

A third aspect of the invention involves a neutralized photofabricated article or object, wherein such component was processed via any of the methods described in any of the embodiments according to the first or second aspects of the invention, and is the cured product of any of the compositions described in any of the embodiments according to the first or second aspects of the invention. In an embodiment, the neutralized photofabricated article possesses biocompatibility characteristics. In an embodiment, such biocompatibility is determined by the article's cytotoxicity performance, as measured under ISO 10993-5.

DETAILED DESCRIPTION

As used herein, "biocompatibility" means the relative ability of an object or material to be in contact with a living system for a specified time-period and prescribed use without producing an adverse effect. A "biocompatible" article or material is one that exhibits a high degree of biocompatibility, as determined by an objective measure. There are several objective measures of biocompatibility. Some potential objective measures of biocompatibility include performance in sensitization, irritation, and cytotoxicity testing, to name a few. A preferred method to evaluate biocompatibility is a determination of an article's toxicity to cells per ISO 10993-5 (whether via extraction or contact tests). An article is said to exhibit cytotoxic potential for a specified time interval under ISO 10993-5 if, after in vitro testing according to the method as prescribed therein, the cell viability of L-929 fibroblast mouse cells is reduced to less than 70% of a control blank. Therefore, an article does not exhibit cytotoxic potential—and may be considered herein to be biocompatible—if, under the chosen time period and in accordance with ISO 10993-5, the cell viability of L-929 fibroblast mouse cells is reduced to greater than or equal to 70% of the control blank.

Furthermore, as used herein, "residual acid species" means any and/or all acid compounds or moieties, whether in liquid or solid form, remaining in or on the exterior surface of the solid photofabricated article. Residual acid species may include unreacted photoacids or photoacid moieties generated by a cationic photoinitiator, as well as any other acid species or acid moieties formed during, and which remain after, the curing process of the photofabricated article.

A first aspect of the claimed invention is a method of post-treating a solid photofabricated article created via an additive fabrication process, the method comprising the steps of:
 (1) providing a solid photofabricated article created via an additive fabrication process;
 (2) postprocessing said solid photofabricated article; and
 (3) base-washing said photofabricated article in an alkaline solution or dispersion, thereby creating a neutralized photofabricated article;
wherein said solid photofabricated article is the cured product of a radiation curable composition that is capable of undergoing cationic and free-radical polymerization, wherein said cationic and free-radical polymerization is performed simultaneously or sequentially.

Methods according to the first aspect of the claimed invention involve the provision of a solid photofabricated article created via an additive fabrication process. The solid photofabricated articles may be created by any suitable additive fabrication process, including, but not limited to, layerwise or continuous liquid interphase printing techniques. Layerwise techniques are the result of successive layers of radiation curable compositions being selectively applied and/or photocured to build up the three-dimensional article to be formed. Layers of radiation curable compositions may be provided in a number of ways, as will be appreciated by those of skill in the art to which this invention applies. The layer may be of any suitable thickness and shape, and is dependent on the additive fabrication process utilized. In a stereolithography process, for example, a vat of liquid resin lies in a vat. The first layer is set and controlled by a vertically-moveable platform which raises or lowers the liquid level (or with respect to the liquid level) in the vat, along with the intensity, orientation, and focus of a laser which cures to a specified depth below the surface of the liquid resin. Such layers will typically be substantially of a uniform thickness in stereolithography processes. In similar DLP-based processes, instead of a layer determined by a laser depth, the radiation is imparted image-wise in a mask-based pattern, typically by light collimated by a plurality of LED sources. Other similar techniques, such as scan, spin, and selectively photocure processes, are also known. Alternatively, layers may be selectively deposited on a substrate or previous cured layer, as is performed in known jetting processes. The substrate may be a planar build plate or platform, or it may be a powderized bed of particulate resin, for example. Layers may further be provided in a rolling or extrusion process, and may be transported on a moveable foil, film, or carrier, as is described in, e.g., U.S. Pat. No. 8,678,805.

The photofabricated articles themselves are the cured product of a radiation curable composition. In a preferred embodiment, the radiation curable composition from which the photofabricated article has been formed is capable of undergoing cationic polymerization. In other words, the photofabricated article used in the first aspect of the present invention preferably is at least partially cured or solidified via a cationic polymerization mechanism.

In accordance with an embodiment, the radiation curable composition from which the solid photofabricated article has been formed comprises at least one cationically polymerizable component; that is a component which undergoes polymerization initiated by cations or in the presence of acid generators. The cationically polymerizable components may be monomers, oligomers, and/or polymers, and may contain aliphatic, aromatic, cycloaliphatic, arylaliphatic, heterocyclic moiety(ies), and any combination thereof. Suitable cyclic ether compounds can comprise cyclic ether groups as side groups or groups that form part of an alicyclic or heterocyclic ring system.

The cationically polymerizable component may comprise cyclic ether compounds, cyclic acetal compounds, cyclic thioethers compounds, spiro-orthoester compounds, cyclic lactone compounds, or vinyl ether compounds, or any combination thereof.

Suitable cationically polymerizable components include cyclic ether compounds such as epoxy compounds and oxetanes, cyclic lactone compounds, cyclic acetal compounds, cyclic thioether compounds, spiro orthoester compounds, and vinylether compounds. Specific examples of cationically polymerizable components include bisphenol A diglycidyl ether, bisphenol F diglycidyl ether, bisphenol S diglycidyl ether, brominated bisphenol A diglycidyl ether, brominated bisphenol F diglycidyl ether, brominated bisphenol S diglycidyl ether, epoxy novolac resins, hydrogenated bisphenol A diglycidyl ether, hydrogenated bisphenol F diglycidyl ether, hydrogenated bisphenol S diglycidyl ether, 3,4-epoxycyclohexylmethyl-3',4'-epoxycyclohexanecarboxylate, 2-(3,4-epoxycyclohexyl-5,5-spiro-3,4-epoxy)-cyclohexane-1,4-dioxane, bis(3,4-epoxycyclohexylmethyl)adipate, vinylcyclohexene oxide, 4-vinylepoxycyclohexane, vinylcyclohexene dioxide, limonene oxide, limonene dioxide, bis(3,4-epoxy-6-methylcyclohexylmethyl)adipate, 3,4-epoxy-6-methylcyclohexyl-3',4'-epoxy-6'-methylcyclohexanecarboxylate, ε-caprolactone-modified 3,4-epoxycyclohexylmethyl-3',4'-epoxycyclohexane carboxylates, trimethylcaprolactone-modified 3,4-epoxycyclohexylmethyl-3',4'-epoxycyclohexane carboxylates, β-methyl-δ-valerolactone-modified 3,4-epoxycyclohexcylmethyl-3',4'-epoxycyclohexane carboxylates, methylenebis(3,4-epoxycyclohexane), bicyclohexyl-3,3'-epoxide, bis(3,4-epoxycyclohexyl) with a linkage of —O—, —S—, —SO—, —SO$_2$—, —C(CH$_3$)$_2$—, —CBr$_2$—, —C(CBr$_3$)$_2$—, —C(CF$_3$)$_2$—, —C(CCl$_3$)$_2$—, or —CH(C$_6$H$_5$)—, dicyclopentadiene diepoxide, di(3,4-epoxycyclohexylmethyl) ether of ethylene glycol, ethylenebis(3,4-epoxycyclohexanecarboxylate), epoxyhexahydrodioctylphthalate, epoxyhexahydro-di-2-ethylhexyl phthalate, 1,4-butanediol diglycidyl ether, 1,6-hexanediol diglycidyl ether, neopentylglycol diglycidyl ether, glycerol triglycidyl ether, trimethylolpropane triglycidyl ether, polyethylene glycol diglycidyl ether, polypropylene glycol diglycidyl ether, diglycidyl esters of aliphatic long-chain dibasic acids, monoglycidyl ethers of aliphatic higher alcohols, monoglycidyl ethers of phenol, cresol, butyl phenol, or polyether alcohols obtained by the addition of alkylene oxide to these compounds, glycidyl esters of higher fatty acids, epoxidated soybean oil, epoxybutylstearic acid, epoxyoctylstearic acid, epoxidated linseed oil, epoxidated polybutadiene, 1,4-bis[(3-ethyl-3-oxetanylmethoxy)methyl]benzene, 3-ethyl-3-hydroxymethyloxetane, 3-ethyl-3-(3-hydroxypropyl)oxymethyloxetane, 3-ethyl-3-(4-hydroxybutyl)oxymethyloxetane, 3-ethyl-3-(5-hydroxypentyl)oxymethyloxetane, 3-ethyl-3-phenoxymethyloxetane, bis((1-ethyl(3-oxetanyl))methyl)ether, 3-ethyl-3-((2-ethylhexyloxy)methyl)oxetane, 3-ethyl-((triethoxysilylpropoxymethyl)oxetane, 3-(meth)-allyloxymethyl-3-ethyloxetane, 3-hydroxymethyl-3-ethyloxetane, (3-ethyl-3-oxetanylmethoxy)methylbenzene, 4-fluoro-[1-(3-ethyl-3-oxetanylmethoxy)methyl]benzene, 4-methoxy-[1-(3-ethyl-3-oxetanylmethoxy)methyl]-benzene, [1-(3-ethyl-3-oxetanylmethoxy)ethyl]phenyl ether, isobutoxymethyl(3-ethyl-3-oxetanylmethyl)ether, 2-ethylhexyl(3-ethyl-3-oxetanylmethyl)ether, ethyldiethylene glycol(3-ethyl-3-oxetanylmethyl)ether, dicyclopentadiene (3-ethyl-3-oxetanylmethyl)ether, dicyclopentenyloxyethyl (3-ethyl-3-oxetanylmethyl)ether, dicyclopentenyl(3-ethyl-3-oxetanylmethyl)ether, tetrahydrofurfuyl(3-ethyl-3-oxetanylmethyl)ether, 2-hydroxyethyl(3-ethyl-3-oxetanylmethyl) ether, or 2-hydroxypropyl(3-ethyl-3-oxetanylmethyl)ether, or any combination thereof.

The cationically polymerizable component may optionally also contain polyfunctional materials including dendritic polymers such as dendrimers, linear dendritic polymers, dendrigraft polymers, hyperbranched polymers, star branched polymers, or hypergraft polymers with epoxy or oxetane functional groups. The dendritic polymers may contain one type of polymerizable functional group or different types of polymerizable functional groups, for example, epoxy and oxetane functions.

In an embodiment, the composition of the present invention also comprises one or more mono or poly glycidylethers of aliphatic alcohols, aliphatic polyols, polyesterpolyols or polyetherpolyols. Examples of preferred components include 1,4-butanedioldiglycidylether, glycidylethers of polyoxyethylene and polyoxypropylene glycols and triols of molecular weights from about 200 to about 10,000; glycidylethers of polytetramethylene glycol or poly(oxyethylene-oxybutylene) random or block copolymers. In a specific embodiment, the cationically polymerizable component comprises a polyfunctional glycidylether that lacks a cyclohexane ring in the molecule. In another specific embodiment, the cationically polymerizable component includes a neopentyl glycol diglycidyl ether. In another specific embodiment, the cationically polymerizable component includes a 1,4 cyclohexanedimethanol diglycidyl ether.

Examples of commercially available preferred polyfunctional glycidylethers are Erisys™ GE 22 (Erisys™ products are available from Emerald Performance Materials™), Heloxy™ 48, Heloxy™ 67, Heloxy™ 68, Heloxy™ 107 (Heloxy™ modifiers are available from Momentive Specialty Chemicals), and Grilonit® F713. Examples of commercially available preferred monofunctional glycidylethers are Heloxy™ 71, Heloxy™ 505, Heloxy™ 7, Heloxy™ 8, and Heloxy™ 61.

In an embodiment, the cationically polymerizable component includes an epoxide. In an embodiment, the epoxide is 3,4-epoxycyclohexylmethyl-3',4'-epoxycyclohexanecarboxylate (available as CELLOXIDE™ 2021P from Daicel Chemical, or as CYRACURE™ UVR-6105 from Dow Chemical), hydrogenated bisphenol A-epichlorohydrin based epoxy resin (available as EPON™ 1510 from Momentive), 1,4-cyclohexanedimethanol diglycidyl ether (available as HELOXY™ 107 from Momentive), a hydrogenated bisphenol A diglycidyl ether (available as EPON™ 825 from Momentive), or a mixture of dicyclohexyl diepoxide and nanosilica (available as NANOPOX™), or any combination thereof.

The above-mentioned cationically polymerizable compounds can be used singly or in combination of two or more thereof. In embodiments of the invention, the cationically polymerizable component further comprises at least two different epoxy components.

In other embodiments of the invention, the cationically polymerizable component also optionally comprises an oxetane component. In a specific embodiment, the cationic polymerizable component includes an oxetane, for example, an oxetane containing 1, 2 or more than 2 oxetane groups.

In accordance with an embodiment, the liquid radiation curable resin composition for additive fabrication contains a component that is polymerizable by both free-radical polymerization and cationic polymerization. An example of such a polymerizable component is a vinyloxy compound, for example, one selected from the group consisting of bis(4-vinyloxybutyl)isophthalate, tris(4-vinyloxybutyl) trimellitate, and combinations thereof. Other examples of such a polymerizable component include those containing an acrylate and an epoxy group, or an acrylate and an oxetane group, on a same molecule.

The radiation curable composition from which the solid photofabricated article has been formed in an additive fabrication process may include any suitable amounts of the cationically polymerizable component, for example, in certain embodiments, in an amount from about 10 to about 99% by weight of the resin composition. In an embodiment, the cationically polymerizable component is present, relative to the entire weight of the entire radiation curable composition (or alternatively kit of materials if separate components are stored individually), from 20 to 90 wt. %, or from 30 to 90 wt. %, or from 40 to 90 wt. %, or from 50 to 90 wt. %, or from 50 to 80 wt. %, or from 50 to 70 wt. %, or from 50 to 60 wt. %.

In accordance with an embodiment, the radiation curable composition from which the solid photofabricated article has been formed further comprises at least one cationic initiator. Cationic initiators initiate cationic ring-opening polymerization upon exposure to sufficient energy, including thermal activation energy, or actinic radiation of an appropriate wavelength and sufficient dose. In a preferred embodiment, the cationic initiator is a cationic photoinitiator.

In an embodiment, any suitable cationic photoinitiator can be used, for example, those with cations selected from the group consisting of onium salts, halonium salts, iodosyl salts, selenium salts, sulfonium salts, sulfoxonium salts, diazonium salts, metallocene salts, isoquinolinium salts, phosphonium salts, arsonium salts, tropylium salts, dialkylphenacylsulfonium salts, thiopyrilium salts, diaryl iodonium salts, triaryl sulfonium salts, ferrocenes, di(cyclopentadienyliron)arene salt compounds, and pyridinium salts, and any combination thereof.

In another embodiment, the cation of the cationic photoinitiator is selected from the group consisting of aromatic diazonium salts, aromatic sulfonium salts, aromatic iodonium salts, metallocene based compounds, aromatic phosphonium salts, and any combination thereof. In another embodiment, the cation is a polymeric sulfonium salt, or other aromatic heteroatom-containing cations and naphthylsulfonium salt. In another embodiment, the cationic photoinitiator comprises triarylsulfonium salts, diaryliodonium salts, or metallocene-based compounds, or any combination thereof. Onium salts, e.g., iodonium salts and sulfonium salts, and ferrocenium salts, have the advantage that they are generally more thermally stable.

In an embodiment, the cationic photoinitiator has an anion which may include $BF_4^-$, $AsF_6^-$, $SbF_6^-$, $PF_6^-$, $[B(CF_3)_4]^-$, $B(C_6F_5)_4^-$, $B[C_6H_3-3,5(CF_3)_2]_4^-$, $B(C_6H_4CF_3)_4^-$, $B(C_6H_3F_2)_4^-$, $B[C_6F_4-4(CF_3)]_4^-$, $Ga(C_6F_5)_4^-$, $[(C_6F_5)_3B—C_3H_3N_2—B(C_6F_5)_3]^-$, $[(C_6F_5)_3B—NH_2—B(C_6F_5)_3]^-$, tetrakis(3,5-difluoro-4-alkyloxyphenyl)borate, tetrakis(2,3,5,6-tetrafluoro-4-alkyloxyphenyl)borate, perfluoroalkylsulfonates, tris[(perfluoroalkyl)sulfonyl]methides, bis[(perfluoroalkyl)sulfonyl]imides, perfluoroalkylphosphates, tris(perfluoroalkyl)trifluorophosphates, bis(perfluoroalkyl)tetrafluorophosphates, tris(pentafluoroethyl) trifluorophosphates, and $(CH_6B_{11}Br_6)^-$, $(CH_6B_{11}Cl_6)^-$ or other halogenated carborane anions, or any combinations or derivatives thereof.

Examples of cationic photoinitiators useful for curing at 300-475 nm, particularly at 365 nm UV light, without a sensitizer include 4-[4-(3-chlorobenzoyl)phenylthio]phenyl-bis(4-fluorophenyl)sulfonium hexafluoroantimonate, 4-[4-(3-chlorobenzoyl)phenylthio]phenylbis(4-fluorophenyl) sulfonium tetrakis(pentafluorophenyl)borate, 4-[4-(3-chlorobenzoyl)phenylthio]phenylbis(4-fluorophenyl) sulfonium tetrakis(3,5-difluoro-4-methyloxyphenyl)borate, 4-[4-(3-chlorobenzoyl)phenylthio]phenylbis(4-fluorophenyl)sulfonium tetrakis(2,3,5,6-tetrafluoro-4-methyloxyphenyl)borate, tris(4-(4-acetylphenyl)thiophenyl)sulfonium tetrakis(pentafluorophenyl)borate (Irgacure® PAG 290 from BASF), tris(4-(4-acetylphenyl)thiophenyl)sulfonium tris[(trifluoromethyl)sulfonyl]methide (Irgacure® GSID 26-1 from BASF), tris(4-(4-acetylphenyl)thiophenyl)sulfonium hexafluorophosphate (Irgacure® 270 from BASF), and HS-1 available from San-Apro Ltd.

Other cationic photoinitiators include, either alone or in a mixture: bis[4-diphenylsulfoniumphenyl]sulfide bishexafluoroantimonate; thiophenoxyphenylsulfonium hexafluoroantimonate (available as Chivacure 1176 from Chitec), tris(4-(4-acetylphenyl)thiophenyl)sulfonium tetrakis(pentafluorophenyl)borate (Irgacure® PAG 290 from BASF), tris(4-(4-acetylphenyl)thiophenyl)sulfonium tris[(trifluoromethyl)sulfonyl]methide (Irgacure® GSID 26-1 from BASF), and tris(4-(4-acetylphenyl)thiophenyl)sulfonium hexafluorophosphate (Irgacure® 270 from BASF), [4-(l-methylethyl)phenyl](4-methylphenyl) iodonium tetrakis(pentafluorophenyl)borate (available as Rhodorsil 2074 from Rhodia), 4-[4-(2-chlorobenzoyl)phenylthio]phenylbis (4-fluorophenyl)sulfonium hexafluoroantimonate (as SP-172 from Adeka), SP-300 from Adeka, and aromatic sulfonium salts with anions of $(PF_{6-m}(C_nF_{2+1})_m)^-$ where m is an integer from 1 to 5, and n is an integer from 1 to 4 (available as CPI-200K or CPI-200S, which are monovalent sulfonium salts from San-Apro Ltd., TK-1 available from San-Apro Ltd., or HS-1 available from San-Apro Ltd.).

In various embodiments, the radiation curable composition from which the solid photofabricated article is formed comprises a cationic photoinitiator which may be activated by laser or LED light operating at any wavelength in either the UV or visible light spectrum. In particular embodiments, the irradiation is from a laser or LED emitting a wavelength of from 340 nm to 415 nm. In particular embodiments, the laser or LED source emits a peak wavelength of about 340 nm, 355 nm, 365 nm, 375 nm, 385 nm, 395 nm, 405 nm, or 415 nm.

In accordance with embodiments of the invention, the radiation curable composition from which the solid photofabricated article has been formed includes both a cationically polymerizable component (as previously described) in addition to a cationic photoinitiator.

The radiation curable composition from which the solid photofabricated article has been formed may include any suitable amount of the cationic photoinitiator, for example, in certain embodiments, in an amount up to about 15% by weight of the entire composition, in certain embodiments, up to about 5% by weight of the entire composition, and in further embodiments from about 2% to about 10% by weight of the entire composition, and in other embodiments, from about 0.1% to about 5%, or from about 0.5 to 2.5% by weight of the entire composition. In a further embodiment, the amount of cationic photoinitiator is from about 0.2 wt. % to about 4 wt. % of the total composition (or kit of materials, if the compositional components are stored separately prior to photopolymerization), and in other embodiments from about 0.5 wt. % to about 3 wt. %.

In accordance with various embodiments, in addition to or instead of components which undergo cationic polymerization, the radiation curable composition from which the solid photofabricated article has been formed comprises components which undergo free-radical polymerization. In an embodiment, therefore, the radiation curable composition from which the solid photofabricated article has been formed comprises a free-radically polymerizable component. In another embodiment, the composition further comprises a free-radical initiator, preferably a free-radical photoinitiator. In an embodiment, the composition (or kit of materials, if the compositional components are stored separately prior to photopolymerization during the additive fabrication process) comprises, in addition to a cationically polymerizable component and cationic photoinitiator, a free-radically polymerizable component and free-radical photoinitiator. In other embodiments, the composition includes cationically polymerizable components, free-radical photoinitiators, and free-radically polymerizable components. In some embodiments, the composition includes a cationic photoinitiator and additional cationic photoinitiators and/or photosensitizers, along with a cationically polymerizable component and, optionally, free-radically polymerizable components and free-radical photoinitiators.

In accordance with an embodiment of the invention, the radiation curable resin from which the solid photofabricated article has been formed comprises at least one free-radical polymerizable component, that is, a component which undergoes polymerization initiated by free radicals. Free-radically polymerizable components are well-known, and are described in, i.a., U.S. Pat. No. 9,228,073 (He et al.) and U.S. Pat. No. 9,708,442 (Kwisnek et al.), each of which is hereby incorporated by reference in its entirety.

The free-radically polymerizable components are monomers, oligomers, and/or polymers; they are monofunctional or polyfunctional materials, i.e., have 1, 2, 3, 4, 5, 6, 7, 8, 9, 10 . . . 20 . . . 30 . . . 40 . . . 50 . . . 100, or more functional groups that can polymerize by free radical initiation, may contain aliphatic, aromatic, cycloaliphatic, arylaliphatic, heterocyclic moiety(ies), or any combination thereof. Examples of polyfunctional materials include dendritic polymers such as dendrimers, linear dendritic polymers, dendrigraft polymers, hyperbranched polymers, star branched polymers, and hypergraft polymers; see, e.g., US 2009/0093564 A1. The dendritic polymers may contain one type of polymerizable functional group or different types of polymerizable functional groups, for example, acrylates and methacrylate functions.

Free-radically polymerizable compounds may be used singly or in combination of two or more. The radiation curable composition from which the solid photofabricated article has been formed may incorporate any suitable amount of free-radically polymerizable components, for example, in certain embodiments, in an amount up to about 40 wt. % of the entire composition (or kit of materials, if the compositional components are stored separately prior to photopolymerization), in certain embodiments, from about 2 to about 40 wt. % of the entire composition, in other embodiments from about 5 to about 30 wt. %, and in further embodiments from about 10 to about 20 wt. % of the entire composition.

In accordance with an embodiment, the radiation curable composition from which the solid photofabricated article has been formed further comprises at least one free-radical initiator. Free-radical initiators form or facilitate the formation of radicals, thereby inducing radical polymerization reactions. Radicals may be formed upon exposure to sufficient energy, including thermal activation energy, reaction with another unstable molecule or compound, or actinic radiation of an appropriate wavelength and sufficient dose. In a preferred embodiment, the free-radical initiator is a free-radical photoinitiator.

Typically, free radical photoinitiators are divided into those that form radicals by cleavage, known as "Norrish Type I" and those that form radicals by hydrogen abstraction, known as "Norrish type II". The Norrish type II photoinitiators require a hydrogen donor, which serves as the free radical source. As the initiation is based on a bimolecular reaction, the Norrish type II photoinitiators are generally slower than Norrish type I photoinitiators, which are based on the unimolecular formation of radicals. On the other hand, Norrish type II photoinitiators possess better optical absorption properties in the near-UV spectroscopic region. Photolysis of aromatic ketones, such as benzophenone, thioxanthones, benzil, and quinones, in the presence of hydrogen donors, such as alcohols, amines, or thiols leads to the formation of a radical produced from the carbonyl compound (ketyl-type radical) and another radical derived from the hydrogen donor. The photopolymerization of vinyl monomers is usually initiated by the radicals produced from the hydrogen donor. The ketyl radicals are usually not reactive toward vinyl monomers because of the steric hindrance and the delocalization of an unpaired electron.

Free-radical photoinitiators are well-known. Examples of free-radical photoinitiators include benzoylphosphine oxides, aryl ketones, benzophenones, hydroxylated ketones, 1-hydroxyphenyl ketones, ketals, or metallocenes.

In an embodiment, the radiation curable composition from which the solid photofabricated article has been formed includes at least one free-radical photoinitiator such as one or more of the following: 2,4,6-trimethylbenzoyl diphenylphosphine oxide and 2,4,6-trimethylbenzoyl phenyl, ethoxy phosphine oxide, bis(2,4,6-trimethylbenzoyl)-phenylphosphineoxide, 2-methyl-1-[4-(methylthio)phenyl]-2-morpholinopropanone-1,2-benzyl-2-(dimethylamino)-1-[4-(4-morpholinyl) phenyl]-1-butanone, 2-dimethylamino-2-(4-methyl-benzyl)-1-(4-morpholin-4-yl-phenyl)-butan-1-one, 4-benzoyl-4'-methyl diphenyl sulphide, 4,4'-bis (diethylamino) benzophenone, and 4,4'-bis(N,N'-dimethylamino) benzophenone (Michler's ketone), benzophenone, 4-methyl benzophenone, 2,4,6-trimethyl benzophenone, dimethoxybenzophenone, 1-hydroxycyclohexyl phenyl ketone, phenyl (1-hydroxyisopropyl)ketone, 2-hydroxy-1-[4-(2-hydroxyethoxy) phenyl]-2-methyl-1-propanone, 4-isopropylphenyl(1-hydroxyisopropyl)ketone, oligo-[2-hydroxy-2-methyl-1-[4-(1-methylvinyl)phenyl] propanone], camphorquinone, 4,4'-bis(diethylamino) benzophenone, or benzil dimethyl ketal, or bis(eta 5-2-4-cyclopentadien-1-yl) bis[2,6-difluoro-3-(1H-pyrrol-1-yl) phenyl] titanium, or any combination thereof.

The radiation curable composition from which the solid photofabricated article has been formed may include any suitable amount of the free-radical photoinitiator, for example, in certain embodiments, in an amount up to about 10 wt. % of the total composition (or kit of materials, if the compositional components are stored separately prior to photopolymerization), in certain embodiments, from about 0.1 to about 10 wt. % of the total composition, and in further embodiments from about 1 to about 6 wt. % of the total composition, or from 0.1 to 5 wt. % of the total composition.

In an embodiment, the solid photofabricated article is the cured product of a radiation curable composition or kit of materials comprising a free-radically polymerizable component, a cationically polymerizable component, and at least one initiator. It will be understood that the cationic and free-radical polymerization may be performed simultaneously or sequentially.

In accordance with an embodiment of the invention, the radiation curable resin from which the solid photofabricated article has been formed optionally comprises a portion of solvent. Solvents are primarily used to facilitate the dispersion and miscibility of other of the compositional constituents as described elsewhere herein, especially photoinitiators or fillers. They facilitate the handling or transportation of other reactive components as well. Solvents are typically present in a radiation curable composition for additive fabrication as a substance which facilitates the dissolution of powder-based photoinitiators, including many cationic photoinitiators as described elsewhere herein. As used herein, a material is considered a solvent only to the extent it is not also considered one of the other compositional elements, as various cationically polymerizable (such as low molecular weight epoxy monomers) or free-radically polymerizable (such as low molecular weight acrylate monomers) components may also serve a dual function as a solvent as well. Therefore, in an embodiment, the solvent is an inert or non-reactive compound.

Water is the most common solvent, although many other solvents are known and appreciated by the person having ordinary skill in the art to which this invention applies. Solvents may be nonpolar or polar. Common nonpolar solvents include cyclopentate, hexane, cyclohexane, benzene, toluene, chloroform, diethyl ether, and dichloromethane. Common polar solvents include ethyl acetate, acetone, dimethylformamide, acetonitrile, dimethyl sulfoxide, nitromethane, and propylene carbonate. Among these, propylene carbonate is preferred.

If used, a solvent may be incorporated into the radiation curable composition from which the solid photofabricated article has been formed in any suitable amount, including, relative to the weight of the entire composition (or kit of materials, if the compositional components are stored separately prior to photopolymerization), from 0 to 20 wt. %, or from 0 to 10 wt. %, or from 0 to 5 wt. %, or from 0 to 3 wt. %, or from 0.5 to 10 wt. %, or from 0.5 to 3 wt. %, or from 0.1 to 1.5 wt. %.

In accordance with an embodiment of the invention, the radiation curable resin from which the solid photofabricated article has been formed optionally comprises one or more additives. Possible additives include stabilizers, dyes, pigments, antioxidants, wetting agents, photosensitizers, chain transfer agents, leveling agents, defoamers, surfactants and the like. The radiation curable resin composition for additive fabrication of the invention can further include one or more additives such as bubble breakers, acid scavengers, thickeners, flame retardants, silane coupling agents, ultraviolet absorbers, resin particles, core-shell particle impact modifiers, soluble polymers, or block polymers.

Stabilizers are often added to the resin compositions in order to further prevent a viscosity build-up, for instance a viscosity build-up during usage in a solid imaging process. Useful stabilizers include those described in U.S. Pat. No. 5,665,792, the entire disclosure of which is hereby incorporated by reference. In the instant claimed invention, the presence of a stabilizer is optional. In a specific embodiment, the liquid radiation curable composition from which the solid photofabricated article has been formed comprises from 0.1 wt. % to 3% of a stabilizer.

In an embodiment, the composition contains a filler. Examples of fillers include both organic and inorganic particulate fillers. The filler may possess a surface functionality or not, the surface functionality comprising a polymerization group that is capable of (co)polymerization with one or more of the urethane methacrylate oligomer, reactive diluent monomer, or network building agent. The filler may comprise organic or inorganic particles of micron size or less, such as nano-particles. Examples include core-shell particles, inorganic particles, pigments, or plasticizers. In an embodiment, the particulate filler comprises an inorganic filler, such as $SiO_2$, $AlO_2$, $TiO_2$, $ZnO_2$, $SnO_2$, Am—$SnO_2$, $ZrO_2$, Sb—$SnO_2$, $Al_2O_3$, or carbon black. Inorganic fillers, especially silica-based fillers, are described in, i.a., U.S. Pat. No. 9,228,073.

In an embodiment, the particulate filler comprises an organic filler, such as polyurethane particles, polystyrene particles, poly(methyl methacrylate) particles, or polycarbonate particles. In an embodiment, the particulate filler comprises an impact modifier. Impact modifiers are described in, i.a. U.S. Pat. No. 9,676,899.

Examples of impact modifiers include elastomer particles. In an embodiment, the impact modifying components, which can be dispersed into the composition, are elastomers based on copolymers of ethylene or propylene and one or more $C_2$ to $C_{12}$ α-olefin monomers.

Examples of such are ethylene/propylene copolymers or ethylene/propylene copolymers, optionally containing a third copolymerizable diene monomer (EPDM), such as 1,4-hexadiene, dicyclopentadiene, di-cyclooctadiene, methylene norbornene, ethylidene norbornene and tetrahydroindene; ethylene/α-olefin copolymers, such as ethylene-octene copolymers and ethylene/α-olefin/polyene copolymers.

In an embodiment, the additives comprise an impact modifier that is polybutadiene, polyisoprene, styrene/butadiene random copolymer, styrene/isoprene random copolymer, acrylic rubbers (e.g. polybutylacrylate), or poly(hexamethylene carbonate), or any combination thereof.

Elastomer particles may be prepared by a variety of means, including by isolation from a latex made via emulsion polymerization. The average size of these elastomer particles is preferably between about 10 nm and about 10 µm. In an embodiment, the average size of the elastomer particles if from 10 nm to 1 µm.

Optionally, the elastomer may be modified to contain reactive groups that (co)polymerize with the first or second network-forming component. This modification can be introduced by reactive grafting or by copolymerization. Commercial examples of the latter are Lotader random ethylene/acrylate copolymers AX8840 (glycidyl methacrylate/GMA modified), AX8900 and AX8930 (GMA and maleic anhydride modified/MA) produced by Arkema.

Optionally, a shell may be present on the particles that can be introduced, e.g., via grafting or during a second stage of emulsion polymerization. Examples of such particles are core-shell impact modifier particles that contain a rubber core and a glassy shell. Examples of core materials are polybutadiene, polyisoprene, acrylic rubber (e.g. polybutylacrylate rubber), styrene/butadiene random copolymer, styrene/isoprene random copolymer, or polysiloxane. Examples of shell materials or graft copolymers are (co) polymers of vinyl aromatic compounds (e.g. styrene) and vinyl cyanides (e.g. acrylonitrile) or (meth)acrylates (e.g. MMA).

Optionally, polymerizable groups can be incorporated into the shell by copolymerization, such as copolymerization with glycidyl methacrylate, or by treatment of the shell to form reactive functional groups.

Commercially available products of these core-shell type elastomer particles are Resinous Bond RKB (dispersions of core-shell particles in epoxy manufactured by Resinous Chemical Industries Co., Ltd.), Durastrength D400, Durastrength 400R (manufactured by Arkema Group), Paraloid EXL-2300 (non-functional shell), Paraloid EXL-2314 (epoxy functional shell), Paraloid EXL-2600, Paraloid EXL-3387 and Paraloid KM-365 (manufactured by Dow), Genioperl P53, Genioperl P23, Genioperl P22 (manufactured by Wacker Chemical), Kane Ace MX products (manufactured by Kaneka), and the like.

Other examples of such elastomer particles are crosslinked polyorganosiloxane rubbers that may include dialkylsiloxane repeating units, where "alkyl" is $C_1$-$C_6$ alkyl. The particles may be modified to include reactive groups, preferably on the surface of the particles.

Examples of polyorganosiloxane elastomer particles that are commercially available are Albidur EP 2240(A), Albidur EP 2640, Albidur VE 3320, Albidur EP 5340, Albidur EP 5640, and Albiflex 296 (dispersions of particles in epoxy or vinyl ether resins, Hanse Chemie, Germany), Genioperl M41C (dispersion in epoxy, Wacker Chemical), Chemisnow MX Series and MP Series (Soken Chemical and Engineering Co.).

If present, the additives may be included in an amount from 1 to 40 wt. %, relative to the weight of the entire composition. In an embodiment, the composition includes additives further comprising one or more fillers. In an embodiment, the fillers comprise an impact modifier. In an embodiment, the impact modifier comprises core-shell particles.

In an embodiment, the filler is present in the composition in an amount of 1 wt. % or more, 5 wt. % or more, 10 wt. % or more, 15 wt. % or more, 20 wt. % or more, 30 wt. % or more, 40 wt. % or more, or 50 wt. % or more, based on the total weight of the composition (or kit of materials, if the compositional components are stored separately prior to photopolymerization). In an embodiment, the particulate filler is present in the composition in an amount of 90 wt. % or less, 80 wt. % or less, 70 wt. % or less, 60 wt. % or less, 50 wt. % or less, 40 wt. % or less, 30 wt. % or less, or 20 wt. % or less, based on the total weight of the composition.

Compositions from which the solid photofabricated articles are formed according to the first aspect of the present invention may be provided as a singular mixture, or the individual components described above herein may be provided as a kit comprising separate containers or enclosures of the compositional elements described. Such kits may be provided in various breakdowns depending on the nature of the additive manufacturing process into which the composition(s) are to be utilized. Some multi-part systems will mix various compositional elements together just prior to jetting, extrusion, or curing. This may be done to enhance stability and to prevent the unwanted reaction of various constituent elements prior to the build process, such as the undesired reaction of a photoinitiator by virtue of ambient or unintended light exposure. In such case, it will be appreciated by those of ordinary skill in the art to which this invention applies that the quantities of materials defined herein will be applicable in the composition at the time such composition is actually cured.

After photofabrication in an additive manufacturing process, the solid articles produced therefrom typically require a cleaning step. This is true particularly in vat-based additive fabrication processes, such as stereolithography, where the photofabricated part is immersed in liquid resin having a high viscosity. The green model, when removed from or raised from the vat, remains very tacky and does not easily separate from accompanying uncured resin which readily adheres to the surface of the solid object. Even in other photofabrication processes, impurities or dirt may attach to the freshly-cured component such that a cleaning operation would be desirable. Therefore, in an embodiment of the first aspect of the current invention, the method involves a cleaning step. Ideally, such cleaning step occurs prior to any subsequent postcuring step, as residual liquid resin which adheres to the green model could undergo partial polymerization if placed in a postcuring apparatus, thereby producing a gummy, sticky, or even cured surface affixed to the article, resulting in a part with poor dimensional accuracy that may no longer be suitable for its intended end-use or purpose.

If a postcuring step is not used, the cleaning step, if utilized, preferably should still occur prior to the basewashing step, as any unreacted or liquid resin may impede the ability of the alkaline solution or dispersion to fully neutralize the photofabricated article, due to a sacrificial layer or coating which would prevent effective interaction between the alkaline solution or dispersion and the residual acid species in or on the part to be neutralized.

Methods of cleaning photofabricated articles are well-known, and will be appreciated by one of ordinary skill in the art to which this invention applies. In one cleaning method, the green model is drained, or removed from the associated source of liquid resin, whereby gravity and rheological forces enable the natural removal of any unwanted, uncured material. In draining methods, the green model may be placed on an absorbent pad (which itself may be wet with a cleaning solvent) to facilitate the draining process.

Another cleaning method involves the use of vapor degreasing. Vapor degreasing is a process of cleaning parts by condensing solvent vapors on three-dimensional photofabricated articles. Such a process utilizes hot vapors of a cleaning solvent (such as chlorinated or fluorinated solvents) to desoil the object from several impurities and other undesired materials such as oils, greases, waxes, and viscous organic polymeric resins. The photofabricated article can be cleaned by exposing it in the solvent vapor. The article is cleaned by virtue of the condensation and subsequent dripping of the solvent vapors acting upon the article, whereby the beads of condensed solvent ideally encapsulate the impurities sought to be removed. Vapor degreasing machines, such as the Vapor Clean® Pro6 and UNILUX 3000, or the Solvac® series of machines from Crest Ultrasonics, are known.

Still another cleaning method involves the immersion of the photofabricated article in a tank or receptacle filled with a liquid cleaning solvent. Optionally, ultrasonic transducers are coupled to the tank or receptacle to allow for a high-frequency agitation to accelerate the impurity removal process. Transducers may be tuned to a frequency of, for example, 20 to about 45 KHz. Parts may be immersed for any suitable time, but such time is typically anywhere from 2 to 15 minutes, and the tank or receptacle may be heated to accelerate the cleaning process. Often, multiple immersion steps are repeated to facilitate the cleaning of locations on the photofabricated article from which impurity extraction is difficult. Popular cleaning solvents include water-soluble solvents, including water-soluble alcohols, such as ethanol and isopropyl alcohol. Particular caution should be exercised with ethanol due to its flammability.

Yet a further cleaning method involves the spray cleaning of a solvent onto a photofabricated article. Such spray cleaning methods may discharge cleaning solvent under high pressure and/or temperature to facilitate the removal of unwanted liquid resin from the green model. One or more of the aforementioned methods can be combined in two or more or hybridized to thoroughly and appropriately clean the photofabricated article, as will be determined and changed according to several factors, including the specific type of additive manufacturing process used to photofabricate the article, the nature of the composition from which the photofabricated article was formed, and the ambient conditions (i.e. temperature, humidity, cleanliness), to name a few.

Methods of the present invention also optionally involve a postcuring step. Postcuring is well-known in the art to which this invention applies. The most common such methods of postprocessing photofabricated articles include thermal postcuring and UV postcuring. In either method, the object of the postcuring includes the ability to improve or lock the physical properties of the photofabricated article, or to enhance the total conversion and degree of cure in the composition from which the solid photofabricated article had been created, or both. Postcuring operations are particularly important to enhance the degree of cationic polymerization that occurs in a photofabricated article. Cationic or ring-opening polymerization—which is a living polymerization mechanism—occurs more slowly than free-radical polymerization, and so a sufficient epoxy- or oxetane-conversion may not occur via the application of actinic radiation in the additive fabrication process itself. Therefore, the application of additional UV or thermal energy may be imparted to complete or facilitate additional cationic conversion.

The first aspect of the invention also involves a base-washing step. In such a step, the solid photofabricated article created via an additive fabrication process is treated or washed in an alkaline solution or dispersion. The base-washing step occurs independently of whether the solid photofabricated article has undergone any cleaning and/or postcuring operations. Inventors have recognized that the biocompatibility of photofabricated articles created via additive manufacturing processes, in particular those articles which are the cured product of a composition which includes components capable of undergoing cationic polymerization, may be greatly enhanced by the addition of a base-washing step.

It is well-known that acid species are necessarily generated as an integral part of the cationic polymerization process. Cationic photoinitiators generate reactive photoacids after having absorbed a sufficient dose of actinic radiation of a prescribed wavelength. The production of reactive photoacids—including exceptionally powerful "superacids"—initiates and propagates the ring-opening cationic polymerization process, which in turn leads to the vitrification, gelation, and/or ultimate solidification of the composition, thereby contributing to the formation of the solid photofabricated article. However, not all photoacids are used up during the polymerization process. Indeed, Inventors have theorized that a significant portion of residual acid species, including such unreacted photoacids or acid moieties, as well as other acid species or acid moieties formed during the cure process, remain interspersed in the polymer network after the additive fabrication process has been completed. Further Inventors have discovered that such residual acid species are difficult to extract and remove from the cured object, such that conventional post-processing operations are insufficient to consistently eliminate them. Additionally, Inventors have discovered that it is important to minimize the prevalence of such compounds or moieties; indeed, the biocompatibility of photofabricated articles which are the cured product of compositions which have undergone cationic polymerization mechanisms may be significantly impacted by the presence of residual acid species.

It has been previously believed that the processes of cleaning the solid photofabricated article would remove such residual acid species from the surface, and that any thermal- and UV-postcuring operation would further the cationic polymerization to the point that all "impurities," including residual acid species, would be eliminated (at least to a sufficient degree and substantial depth below the exterior surface). However, Inventors believe that such conventional processes—without more—are insufficient to eliminate residual acid species. It is believed, without wishing to be bound by any theory, that the residual acid species remain both on and within the exterior surfaces of the solid photofabricated article after cleaning because such acids will not dissolve or wash away effectively in the solvents used in postprocessing operations, in part because they are chemically bonded or partially entrapped within the solid article itself. And, to the extent some superficial residual acid species are effectively washed way, it is suspected that additional (i.e. non-superficial) residual acid species may further leech out of the photofabricated article in the absence of proper neutralization techniques.

Additionally, it is believed without wishing to be bound by any theory, that a substantial quantity of residual acid species do not react completely, even after the application of additional UV and/or thermal in exposure in known postcuring processes. This is because most unreacted cationically polymerizable species are trapped by the already-established polymer network and therefore remain unable to polymerize. These findings are surprising, because it was not previously expected that residual acid species would remain in or on the photofabricated article in sufficient quantities, particularly if such part were subjected to well-established cleaning and postcuring operations.

Because it was not previously appreciated that the presence of a minute quantity of residual acid species would have any appreciable effect on the biocompatibility of the solid photofabricated article created via an additive fabrication process with which they were associated, anyway, few, if any, efforts to mitigate this phenomenon have heretofore been attempted. Armed with an understanding of this residual acid species phenomenon—especially as related to residual acid species produced by cationic photoinitiators—along with its potential impact on a solid photofabricated article's relative biocompatibility performance, Inventors have presently formulated an efficient solution which facilitates its removal. Such a solution involves the application of an alkaline or basic material to the photofabricated article in a neutralizing step. The alkaline material may be present as a solution or dispersion, and is preferably used in liquid form. For ease of use and overall efficacy, the solution or dispersion is preferably present as an aqueous alcoholic solution.

Inventors have discovered that the degree of alkalinity of the alkaline solution or dispersion need not be significant. In an embodiment, therefore, the alkaline solution or dispersion possesses a pH of greater than 7.1, or greater than 7.2, but preferably greater than 7.3, or greater than 7.4, or greater than 7.5. In an embodiment, the alkaline solution possesses a pH range from 7.1 to 14, or from 7.1 to 9, or from 7.4 to 9, or from 7.4 to 8.5, or from 7.5 to 9, or from 7.5 to 8.5, or from 7.5 to 8.0. It will be appreciated that the degree of alkalinity of the alkaline solution or dispersion will depend on the type or nature of the specific residual acid species present in the photofabricated article, the % conversion of the cationic species in the article, the extent and/or nature of any cleaning or postcuring operations, the volume of alkaline solution or dispersion used, the relative surface area to volume ratio of the photofabricated article, and even the specific processing characteristics of the additive fabrication process itself.

In an embodiment, the alkaline solution or dispersion is an aqueous alcoholic solution further comprising a neutralizing agent. The neutralizing agent is the ingredient which is expected to most substantially impact the degree of alkalinity of the aqueous alcoholic solution. Any basic substance can be used as the neutralizing agent, although any such inorganic substance found in biological fluids, along with the associated base salts thereof, are preferred. Suitable neutralizing agents include NaOH; $Na_2CO_3$; $NaHCO_3$; $K_2CO_3$; $Ca(OH)_2$; magnesium salts; phosphates; triethylamine; pyridine; aliphatic, cycloaliphatic, and organic amines; ammonia; ammonium hydroxide; ammonium or quarternary ammonium salts; or KOH; or any mixtures or combinations thereof.

In addition to a neutralizing agent, in an embodiment, the aqueous alcoholic solution further comprises water and a water-soluble alcohol. Suitable water-soluble alcohols include any alcohol, including n-propyl alcohol, methanol, ethanol, propan-1-ol, 1-propanol, isopropyl alcohol, propan-2-ol, 2-propanol, cyclohexanol, isobutyl alcohol, 2-methyl-propan-1-ol, 2-methyl-1-propanol, tert-amyl alcohol, 2-methylbutan-2-ol, 2-methyl-2-butanol, or any combinations thereof.

The ratio between water and alcohol may be any suitable amount, and should be controlled so as to prevent evaporation of the alcohol. The ratio between the neutralizing agent and the water/alcohol content may further be any suitable amount, keeping in mind that the neutralizing agent should be sufficiently dissolved or dispersed. The ratio may be adjusted to the desired alkalinity of the alkaline solution or dispersion used.

The amount of alkaline solution or dispersion required to effectuate the neutralization of the solid photofabricated article depends on several factors. There is no theoretical upper limit to the amount of alkaline solution or dispersion that can be used, but it should be limited in the interest of efficiency and practicality. First, especially if applied via an immersion method, the alkaline solution or dispersion should be present in a volume at least sufficiently large such that, given the shape of the tank or receptacle used, the solid photofabricated article may be completely submerged therein. As such, the amount of the alkaline solution is dependent upon the size and/or volume of the solid photofabricated part. Second, it will be appreciated that not every solid photofabricated article of the same total volume will possess the same amount of residual acid species. Many factors contribute to this quantity, including the % conversion of the cationic species in the article, the specific chemical makeup of the composition from which the solid photofabricated article is formed, the extent and/or nature of any cleaning or postcuring operations, the pH of the alkaline solution or dispersion used, the relative surface area to volume ratio of the photofabricated article, and the specific processing characteristics of the additive fabrication process itself, to name a few.

Perhaps one of the most significant determinants of the quantum of residual acid species present in a solid photofabricated article is the chemical composition of the liquid resin from which the article has been formed. And although residual acid species may reside in a given formulation depending upon impurities and other chemical constituents used, Inventors have determined that for compositions which undergo cationic polymerization mechanisms, especially those with a high cationically polymerizable content, the cationic photoinitiator is the largest contributor to the number of acid species (and in particular superacid species) generated. The specific type of photoacid species generated will necessarily depend on the identity of the cationic photoinitiator or photoinitiators used, which may be chosen from one or more of those discussed elsewhere herein, supra.

One commonly used cationic photoinitiator, Chivacure® 1176 (available from Chitec Technology), is an arylsulfonium hexafluoroantimonate cationic initiator (dissolved in 50% in propylene carbonate). It is expected, therefore, that during cationic polymerization, the $SbF_6^-$ anion of this sulfonium-based photoinitiator will convert into superacids of extreme acidity, including hydrofluoric acid (HF) and fluoroantimonic acid ($H_2FSbF_6$). The presence of an appreciable residual quantity of the strongest known acid in chemistry, fluoroantimonic acid, for example, will necessitate the use of a sufficient amount of alkaline solution or dispersion with an appropriate neutralizing agent. Other known cationic photoinitiators produce fluorophosphoric acid and fluorophenyl boric acid, for example. Indeed, any photoinitiator releasing Lewis (e.g. $BF_3$, $AlCl_3$, $TiCl_4$, etc.) or Brønsted acids (e.g. $CH_3SO_3H$, $CF_3SO_3H$, etc.) may necessitate the use of an alkaline solution with an appropriate neutralizing agent.

Therefore, in various embodiments, depending upon one or more of the aforementioned factors, the alkaline solution or dispersion is present, in an amount by volume relative to the volume of the solid photofabricated article, in a ratio of greater than 5:1, or greater than 10:1, or greater than 20:1, or from 10:1 to 1000:1, or from 10:1 to 500:1, or from 20:1 to 100:1, or from 30:1 to 50:1.

Understanding that the aforementioned plethora of factors will render it impractical to accurately determine in all cases the precise amount of photoacid species residing on or in a particular solid photofabricated article, Inventors have devised a simpler alternative method for prescribing the desired quantity and nature of the alkaline solution or dispersion. That is, it is possible to calculate the maximum quantity of generable photoacid species in a given composition, wherein the maximum quantity of generable photoacid species are deemed herein to derive exclusively from the cationic photoinitiator component of the formulation. In a preferred embodiment, the amount of neutralizing agent is present in the alkaline solution or dispersion in a molar amount greater than, or at least 2×, or at least 4×, or at least 16×, or at least 32×, or at least 64× the maximum quantity of generable photoacid species from the cationic photoinitiator. By way of example, for a solid photofabricated article with a mass of 2 g, and for which the article is the cured product of a radiation curable composition that consisted of 5.0% Chivacure 1176, the following calculation would be used to determine the maximum quantity of generable photoacid species in the article (i.e. assuming all fluorides in the photoinitiator, upon cleavage, would generate HF directly or indirectly):

2g*5.0% arylsulfonium hexafluoroantimonate cationic initiator (50% solvent) ➔ 50 mg PI (M=603)=0.083 mmol PI×6=0.50 mmol HF.

Therefore, in the above example, the maximum quantity of generable photoacid species is 0.50 mmol HF. If a safety factor of 2× were desired, then an alkaline solution or dispersion possessing 1.0 mmol of a neutralizing agent would therefore be required.

In an alternative embodiment, the neutralizing agent is present relative to the maximum quantity of generable photoacid species in the radiation curable composition, in terms of molarity, in a ratio from 1:1 to 1,000:1, or from 1:1 to 100:1, or from 1:1 to 50:1, or from 1.5:1 to 50:1, or from 1.5:1 to 5:1, or greater than 2:1, or from 2:1 to 1,000:1, or from 2:1 to 100:1, or from 2:1 to 5:1.

The alkaline solution or dispersion used in the base-washing step may be applied to the solid photofabricated article in any suitable way. In an embodiment, the solid photofabricated article is immersed in a receptacle or container comprising the alkaline solution or dispersion. In other embodiments, the base-washing may also occur via a spraying operation, or even a vapor degreasing operation. In fact, any of the methods described above to clean the solid photofabricated article may be used to perform the base-washing step as well. As with the cleaning step, ultrasonic transducers or other agitators may be coupled to the vat, receptacle, or vapor degreaser to enhance the article's contact with the neutralizing agent in the alkaline solution or dispersion.

The alkaline solution may be brought into contact with the solid photofabricated article for any suitable length of time. It will be expected that the longer the time of contact, the greater the likelihood that the residual acid species in the solid photofabricated article will be neutralized. Of course, as with other parameters mentioned herein, the duration of the base-washing step will vary upon a multitude of factors, all depending upon the quantum and identity of the actual or expected residual acid species present in or on the solid photofabricated article. In an embodiment, therefore, the base-washing step involves immersing the solid photofabricated article in a receptacle comprising the alkaline solution or dispersion for at least 5 minutes, or from 5-45 minutes, or from 10-30 minutes, or from 15-25 minutes, or from 20-45 minutes. In other embodiments, a sufficient base-washing step lasts from 1 second to 5 minutes, or from 30 seconds to 5 minutes, or from 1 to 5 minutes.

Inventors have also discovered that the temperature at which the base-washing step is conducted may impact the effectiveness of the neutralization. It is believed that higher temperature application of the alkaline solution or dispersion induces superior neutralization performance. Of course, the temperature should not be so great so as to exceed the Tg of the solid photofabricated article, the evaporation temperature of the alkaline solution or dispersion, or any other temperature above which the reagents would be damaged or degraded. In an embodiment, the temperature at which the alkaline solution or dispersion is applied to the solid photofabricated article, such as the temperature of immersion or the spraying temperature, is at least 23 degrees Celsius, or at least 35° C., or from 23-90° C., or from 23-80° C., or from 23-70° C., or from 23-60° C., or from 23-50° C., or from 30-50° C., or from 35-50° C.

The base-washing methods described herein may be conducted once or may be repeated two or more times, including the utilization of one or more of the techniques herein described. Of course, it is recommended that clean and sterile receptacles, bottles, gloves, etc. be used to reduce the number of non-acid impurities that may be introduced during the base-washing process. The completion of the base-washing step as prescribed herein results in a neutralized photofabricated article.

The neutralized photofabricated article may optionally be subjected to another cleaning step, this time to remove unwanted quantities of the alkaline solution or dispersion, or to otherwise remove any other unwanted contaminants that may have been introduced during the base-washing step. This additional cleaning step may be carried out in accordance with any known method as will be appreciated by the skilled artisan to which this invention applies, or in any event any one of the cleaning methods herein described, supra.

After the base-washing and optional second cleaning step, the neutralized photofabricated article may further be subjected to a sterilization process. Such processes will be focused on the eradication of microbial and/or biological contaminants which could otherwise detrimentally affect the biocompatibility of the neutralized photofabricated article. Any suitable sterilization technique may be applied to the neutralized photofabricated article, as will be appreciated by the skilled artisan to which this invention applied. Such processes well-known processes include steaming, superheating, disinfecting, gamma sterilizing, electron beam sterilizing, or ethylene oxide sterilizing. In an embodiment, any of the aforementioned sterilization techniques may be performed, either singularly or in combination of two or more.

In an embodiment, the neutralized photofabricated article processed by the methods of the first aspect of the current invention is a biocompatible article. The biocompatible nature of the article will depend upon the desired end-use of the article, and the method by which biocompatibility is determined. In an embodiment, the neutralized photofabricated article is biocompatible when evaluated under ISO 10993-5 (whether via extraction or contact tests). In an embodiment, the ISO 10993-5 method utilized to evaluate biocompatibility involves a contact test. In another embodiment, such method involves an extraction test. The extraction time may any prescribed time period, although extraction tests of 24 and 72 hours are common.

It will not be expected that all solid photofabricated articles processed according to the methods of the current invention will necessarily possess biocompatibility (whether under ISO 10993-5 or other objective measures of biocompatibility), as such a determination is dependent upon a multitude of factors, including the specific nature of the end-use application, the chemical composition from which the solid photofabricated article was formed, the geometry of the article, the additive manufacturing process utilized to fabricate the article, the type, extent, and quality of any cleaning, postcuring, and/or sterilization techniques, and the effectiveness in the level of sanitation and proper handling of the article itself at all points in the additive manufacturing, post-processing, and transportation process. Indeed, solid photofabricated articles which are cytotoxic for reasons other than the presence of residual acid species should not be expected to be rendered biocompatible when processed according to the methods prescribed according to the current invention.

Conversely, it will be appreciated that not every solid photofabricated article will require the application of post-processing methods as prescribed herein. This is because several existing types of radiation curable materials for additive fabrication processes are already known to be capable of producing biocompatible solid photofabricated articles without the requirement that they be subjected to the post-processing techniques prescribed and claimed herein.

However, according to a preferred embodiment, the neutralized photofabricated article exhibits superior biocompatibility performance, especially when compared to another solid photofabricated article of substantially the same shape, construction, and composition that had not been post-processed according to methods of the first aspect of the current invention. This is believed to be especially true wherein the neutralized photofabricated article (and the other solid photofabricated article of substantially the same shape, construction, and composition) is the cured product of a radiation curable composition that is capable of undergoing cationic polymerization, or one which includes cationic photoinitiators and/or cationically polymerizable components.

In an embodiment, the neutralized photofabricated article, when subjected to a cytotoxicity test per ISO 10993-5 at an extraction time of less than or equal to 24 hours, exhibits a cell viability above 70%, or above 75%, or above 80%, or from 70-99.9%, or from 70-98%, or from 70-95%, or from 70-90%, or from 70-85%. In such an embodiment, the like-performing neutralized photofabricated article is said to exhibit no cytotoxic potential and is therefore a biocompatible article. It is understood, however, that the determination of biocompatibility for a particular end-use application may require testing via other means as well, such as sensitization, irritation, and/or other tests.

The biocompatible articles described herein may be used for any suitable purpose. Such articles may be utilized as a surgical tool, surgical drill guide, dental retainer, dental crown, bridge, aligner, cranial plate, bending and fitting model, intraoral appliance, splint, pre- and peri-operative model, surgical tool, bracket placement, orthopedic device, medical splint or wafer, or customized patient fluid-contacting device. As will be appreciated by the person of ordinary skill in the art to which this invention applies, the precise nature of the biocompatibility of the article will depend upon the specific requirements of the end-use application or purpose.

A second aspect of the claimed invention is a method comprising the steps of:
  providing a photofabricated object created via an additive fabrication process, said photofabricated object possessing a residual quantity of an acid or a base; and
  treating said photofabricated object with a treatment composition possessing a pH and comprising a neutralizing agent to form a neutralized photofabricated object;
  wherein said neutralizing agent is configured to neutralize at least a portion of the residual quantity of the acid or base.

As in the first aspect of the invention, according to the second aspect of the invention, the method involves a process of, inter alia, forming a neutralized photofabricated object. However, according to the second aspect, the neutralization may be utilized to remove not only unwanted acid species, but also unwanted base species as well. In such a method, the nature of the treatment composition will depend upon the known identity of residual acid species (or base species, as the case may be), and accordingly, such a treatment composition will not be necessarily limited to an alkaline solution or dispersion (although, for the avoidance of any doubt, an alkaline solution or dispersion could be considered to be a treatment composition). It will be appreciated that just as the neutralization of residual acid species on or in the exterior surfaces of a given solid photofabricated article may be effectuated by the treatment with a treatment composition of an alkaline nature, so too may the neutralization of residual base species by effectuated by treatment with a treatment composition of an acidic nature. Therefore, in an embodiment, the residual species comprise a residual quantity of acids, and the treatment composition possesses an alkaline or basic pH, wherein the neutralizing agent is a base compound (or salt thereof). In another embodiment, the residual species comprise a residual quantity of bases, and the treatment composition possesses an acidic pH, wherein the neutralizing agent is an acid compound.

In an embodiment, the treatment composition is chosen such that it possesses a pH which falls on the opposite side of neutral (7.0) as the pH of the net amount of any residual acid or base species on or in the exterior surfaces of the solid photofabricated article. Stated another way, the mathematical sign (i.e. positive or negative) of the value determined by subtracting 7.0 from the pH of the treatment composition must be different than the mathematical sign of the value determined by subtracting 7.0 from the pH of the net quantity of any residual acid or base species on or in the exterior surfaces of the solid photofabricated article. By way of example, if the pH of the net quantity of any residual acid or base species of the solid photofabricated article is 3, then the value determined by subtracting 7.0 from said pH would be −4. In such case, the treatment composition must be formulated and/or selected such that the value between its pH minus 7.0 is a positive number; i.e. that it has a pH above 7.0.

According to embodiments of the second aspect of the present invention, the method may further comprise additional steps, such as cleaning, postcuring, and sterilizing. The specific aspects and examples of different cleaning, postcuring, and sterilization techniques described with respect to the first aspect of the present invention are equally applicable to the second aspect as well. Furthermore, such additional optional postprocessing steps may occur once or multiple times in any order relative to the providing and treating steps, although it is preferred that at least one cleaning step occurs prior to the treating step. Further, it is preferred that any postcuring step, be it a thermal or UV postcuring operation, will occur after a first cleaning step but before the treating step, although this is not necessarily required.

A third aspect of the invention involves a neutralized photofabricated article or object, wherein such component was processed via any of the methods described in any of the embodiments according to the first or second aspects of the invention and is the cured product of any of the compositions described in any of the embodiments according to the first or second aspects of the invention. In an embodiment, the neutralized photofabricated article possesses biocompatibility characteristics. In an embodiment, such biocompatibility is determined by the article's cytotoxicity performance, as measured under ISO 10993-5. In an embodiment, the neutralized photofabricated article exhibits no cytotoxic potential under ISO 10993-5, after an extraction of no greater than 24 hours, or no greater than 72 hours, or no greater than 96 hours. The cell viability after such test remains, in an embodiment, above 70%, or above 75%, or above 80%, or from 70-99.9%, or from 70-98%, or from 70-95%, or from 70-90%, or from 70-85%.

The following examples further illustrate the invention but, of course, should not be construed as in any way limiting its scope.

EXAMPLES

These examples illustrate embodiments of the methods and articles of the instant invention. Table describes the various components of the liquid radiation curable resins for additive fabrication used in the present examples.

TABLE 1

| Component | Function | Chemical Descriptor | Supplier/ Manufacturer |
|---|---|---|---|
| Somos ® BioClear | Radiation curable composition from which the solid photofabricated article has been formed | Proprietary blend of 5-40 wt. % of free-radically polymerizable component(s), 50-90 wt. % cationically polymerizable component(s), 0.1-5 wt. % free-radical photoinitiator(s), 0.5-2.5 wt. % cationic photoinitiator(s), 0-40 wt. % additives | DSM |
| Somos ® GP Plus | Radiation curable composition from which the solid photofabricated article has been formed | Proprietary blend of 5-40 wt. % of free-radically polymerizable component(s), 20-90 wt. % cationically polymerizable component(s), 0.1-5 wt. % free-radical photoinitiator(s), 0.5-2.5 wt. % cationic photoinitiator(s), 0-40 wt. % additives including an impact modifier | DSM |
| Isopropyl Alcohol (IPA) | Solvent | CAS #: 67-63-0; 99% purity | Nexeo Solutions |
| Di(propylene glycol) butyl ether | Solvent | CAS # 29911-28-2; 99% purity | Nexeo Solutions |

Examples 1-4

Four photofabricated articles in the shape of conventional dental aligners were formed via a stereolithography process. The articles were the cured product of two radiation curable compositions, namely Somos® BioClear (examples 1-2) and GIP Plus (examples 3-4), and processed according to the methods described herein, below. The temperature at which the base-washing step occurred for each sample is shown in Table 3 below. For examples 1, 2, and 4, the sequence of processing was as follows: (1) photofabrication/printing, (2) cleaning, (3) postcuring, and finally (4) basewashing. For example 3, however, the sequencing was changed such that the basewashing step occurred prior to the postcuring step. All articles were then subjected to cytotoxicity testing under ISO 10993-5 at an extraction time of 24 hours each. The results of the cytotoxicity test are depicted in Table 4.

Photofabrication Settings

The solid photofabricated articles of examples 1 and 2 were the cured product of Somos® BioClear, whereas those of examples 3 and 4 were the cured product of Somos® GP Plus. Each of the articles was photofabricated via a stereolithography process on an SLA Viper 3 machine (manufactured by 3D Systems Corp.) using 3D Lightyear software v. 1.5.2. The articles created were in the shape of a conventional dental aligner.

All parts were printed using the same build style and machine. Resin settings were optimized to ensure basic printability through working curve analysis. In software, all parts were arranged unidirectionally on the build platform to ensure constant part orientation and build style throughout the 3D printing process.

Three build settings are described in Tables 2A and 2B below. In these descriptions, hatch angles refer to a command where the laser forms a crosshatch pattern in the specified angles. Fill angles refer to a continuous fill due to a laser trace scanning unidirectionally in the specified angle. Up and Down hatch/fill angles refer to settings specific to the uppermost or lowermost facing surfaces. The uppermost surfaces have no additional resin layers applied above them. The lowermost surfaces have only supports beneath them.

The hatch spacings refer to the distance (in inches) across each "box" in a drawn crosshatch. The fill spacings refer to the resolution of the continuous fill command. The cure depth input refers to a scanning speed that accounts for intended depth of cure, in "mils" units. The overcure command is similar to the cure depth. Increasing the value on each, leads to longer UV exposure for the impacted resin layer. Finally, border commands (in mils units) refer to the drawn borders on an SLA part. Based on the orientation and geometry of a part, these commands can have an impact on build quality and part performance properties.

TABLE 2A

Cure settings used to fabricate the articles representing Examples 1-2

| Build Setting | #1 | #2 | #3 |
|---|---|---|---|
| # of Up Hatches | | 3 | |
| # of Down Hatches | | 3 | |
| # of Layer Hatches | | 3 | |
| Up Hatch Angle | 0 | 60 | 120 |

TABLE 2A-continued

Cure settings used to fabricate the articles representing Examples 1-2

| Build Setting | #1 | #2 | #3 |
|---|---|---|---|
| Up Hatch Overcure | 0.012 | 0.012 | 0.012 |
| Up Hatch Spacing | 0.075 | 0.075 | 0.075 |
| Down Hatch Angle | 0 | 60 | 120 |
| Down Hatch Overcure | 0.012 | 0.012 | 0.012 |
| Down Hatch Spacing | 0.075 | 0.075 | 0.075 |
| Layer Hatch Angle | 0 | 60 | 120 |
| Layer Hatch Overcure | 0.012 | 0.012 | 0.012 |
| Layer Hatch Spacing | 0.075 | 0.075 | 0.075 |
| # of Up Fills | | 2 | |
| Up Fill Angle | 0 | 90 | n/a |
| Up Fill Cure Depth | 0.01 | 0.01 | n/a |
| Up Fill Spacing | 0.04 | 0.04 | n/a |
| # of Down Fills | | 2 | |
| Down Fill Angle | 0 | 90 | n/a |
| Down Fill Cure Depth | 0.01 | 0.01 | n/a |
| Down Fill Spacing | 0.04 | 0.04 | n/a |
| Layer Border | | 0.01 | |
| Layer Border Prime | | 0.01 | |
| Down Border | | 0.01 | |
| Up Border | | 0.01 | |

TABLE 2B

Cure settings used to fabricate the articles representing Examples 3-4

| | |
|---|---|
| # of Up Hatches | 4 |
| # of Down Hatches | 4 |
| # of Layer Hatches | 4 |
| Up Hatch Angle | 90 |
| Up Hatch Overcure | −0.001 |
| Up Hatch Spacing | 0.004 |
| Down Hatch Angle | 90 |
| Down Hatch Overcure | −0.001 |
| Down Hatch Spacing | 0.004 |
| Layer Hatch Angle | 90 |
| Layer Hatch Overcure | −0.001 |
| Layer Hatch Spacing | 0.004 |
| # of Up Fills | 2 |
| Up Fill Angle | 90 |
| Up Fill Cure Depth | 0.01 |
| Up Fill Spacing | 0.004 |
| # of Down Fills | 2 |
| Down Fill Angle | 90 |
| Down Fill Cure Depth | 0.01 |
| Down Fill Spacing | 0.004 |
| Layer Border | 0.007 |
| Layer Border Prime | 0.007 |
| Down Border | 0.007 |
| Up Border | 0.007 |

Printing of Articles 12 aligner STL print parts built from BioClear were arranged on a virtual platform for printing. Separately, 9 aligner STL print parts build from GP Plus were arranged on the virtual platform for printing. Platforms were cleaned using IPA and dried prior to all 3D printing procedures.

A clean platform was loaded onto the 3D Systems Viper machine. The recoater blade was wiped clean with Isopropyl alcohol. A gap check was conducted and the recoater blade was adjusted accordingly. Clean latex gloves were used for every interaction involving the 3D Printer and its associated components.

A gap check was conducted and the recoater blade aligned with the gap blocks to ensure accuracy and quality. Upon completion of the print job, the build tray was lifted and placed in an angle above the printing vat to allow excess resin to drain.

Cleaning

During the 15 minutes draining time, two clean 1 L nalgene bottles were pre-weighed and labeled "1" and "2". The nalgene bottles were filled 40:1 with 99.7% isopropyl alcohol to part volume (including supports). This means that for aligner samples, 1500 g 99.7% isopropyl alcohol was added to the nalgene bottle for 12 aligner parts. An unused glass platform was wiped down with 99.7% acetone using a lint-free lens cleaning wipe, and placed in a clean 90° C. glass cleaning oven. Clean latex gloves were used for all handling of printed parts.

Parts were removed from the build platform with supports still attached and placed directly into nalgene bottle "1". Nalgene bottle "1" was placed in a light agitation chamber for 10 minutes at 32.2° C. The parts were then removed from nalgene bottle "1" and placed directly into nalgene bottle "2". Nalgene bottle "2" was then placed in a light agitation chamber for 10 minutes at 32.2° C.

During the second 10 minutes agitation time, the glass platform was removed from the oven and allowed to cool to room temperature. After the second 10 minutes agitation time, the parts were removed from nalgene bottle "2", dried using compressed air, and arranged on the clean glass platform.

Postcuring

Parts were arranged on a clean glass platform. The platforms were placed in a 3D Systems PCA oven with ten 40 Watt and 0.88 Ampere long fluorescent bulbs arranged five to a side, with broad wavelength for 30 minutes. The parts were then flipped over and postcured under identical conditions for 30 minutes. Prior to use, the PCA oven was wiped down with isopropyl alcohol. The parts were then individually wrapped in cleanroom residue-free paper and packaged in a 1-liter nalgene bottle. The nalgene bottle containing packaged parts were then placed in a conditioning room with controlled temperature and humidity for at-least 5 days.

Base-Washing

For the base-washing step, clean latex gloves were used throughout the entire process. First, two nalgene (1 liter) bottles were thoroughly cleaned with isopropyl alcohol (IPA) and dried with a flow of compressed air until they appeared visually dry. Then, the first nalgene bottle was filled with approximately 40 mL of water, and approximately 82 mg of the neutralizing agent sodium bicarbonate ($NaHCO_3$) was added, after which the contents were thoroughly stirred until the sodium bicarbonate had visibly fully dissolved therein. Next, approximately 40 mL of IPA was added to the solution, and the liquid was stirred for 2 minutes. Meanwhile, the second nalgene bottle was filled with about 80 mL of IPA (said IPA having a density of 0.785 g/mL). Both bottles were pre-heated: Example 1 was placed in a shaker which was placed in an oven to a desired temperature (37° C.), whereas Example 2 was placed in an oil bath which was set at another desired temperature (50° C.). Examples 3 and 4, meanwhile, were processed at approximately room temperature (22-25° C.).

Next, the article was added to the first nalgene bottle (containing the aqueous alcoholic alkaline solution consisting of water, IPA, and sodium bicarbonate). After this, the bottle was shaken for 20 minutes ("washing time") using a shaker, all while maintaining the temperature of the solution to the value specified in Table 3 below in reference to the row beginning "Base-wash temperature." Visual checks on the turbidity of the solution were periodically performed during the shaking process. After 20 minutes, the neutralized photofabricated article was removed, with the extract stored in a small flask. The pH of this extract was then determined.

The neutralized photofabricated article was then directly placed in the second nalgene bottle (containing IPA) and was shaken for 10 minutes using a shaker, all while maintaining the temperature of the solution at 37 degrees Celsius. After 10 minutes, the article was then removed and dried with a small flow of compressed air until visually dry. Examples 1, 2, and 4 were then placed in a sterile plastic pouch, which was then sealed and sent for biocompatibility testing. Example 3, meanwhile, was then subjected to the postcuring process described above.

TABLE 3

Processing and base-washing step specifics for Examples 1-4

|  | 1 | 2 | 3 | 4 |
|---|---|---|---|---|
| Base-wash temperature (° C.) | 37° | 50° | 22°-25° | 22°-25° |
| IPA added to first bottle | 31.37 g | 31.44 g | 31.39 g | 31.39 g |
| $H_2O$ added to first bottle | 40.3 g | 40.2 g | 40.3 g | 40.3 g |
| $NaHCO_3$ added to first bottle | 82.3 mg | 82.4 mg | 82.3 mg | 82.3 mg |
| IPA added to second bottle | 62.6 g | 62.8 g | 62.6 g | 62.7 g |
| pH of extract | 7.5-8.0 | 7.5-8.0 | 7.5-8.0 | 7.5-8.0 |
| Post-processing sequence | (1) Print (2) Clean (3) Postcure (4) Basewash | (1) Print (2) Clean (3) Postcure (4) Basewash | (1) Print (2) Clean (3) Basewash (4) Postcure | (1) Print (2) Clean (3) Postcure (4) Basewash |

Biocompatibility Testing

To determine the biocompatibility, the articles representing examples 1-4 were subjected to an in vitro study for potential cytotoxic effects following the guidelines of ISO 10993-5, Biological Evaluation of Medical Devices, Part 5 (2009): Tests for In Vitro Cytotoxicity. Tests were performed by NAMSA, 115 Chemin de L'Islon, 38670 Chasse-sur-Rhône, France.

A single preparation of each test article was extracted in a single strength Eagle Minimum Essential Medium (EMEM10) at 37±1° Celsius for 24±2 hours. A negative control (high density polyethylene sheet; extraction rate 6 $cm^2/mL$; provided by the Hatano Research Institute, Food and Drug Safety Center), control blank (86% single strength Eagle Minimum Essential Medium supplemented with 10% foetal bovine serum (v/v), 1% (v/v) L-glutamine (>2 mM) and antibiotics (2% (v/v) Penicillin (100 units/mL)—Streptomycin (>100 micrograms/mL)) and 1% (v/v) Amphotericin B (2.5-3 micrograms/mL)), and a positive control (SRM-A, segmented polyurethane film containing 0.1% zinc diethyldithiocarbamate (ZDEC) at an extraction rate of 6 $cm^2/mL$ (provided by the Hatano Research Institute, Food and Drug Safety Center)) were similarly prepared. Following extraction, triplicate monolayers of L-929 mouse fibroblast cells were dosed with the full-strength extracts (100%) and incubated at 37±1° degree Celsius (humidified) in the presence of 5±1% $CO_2$ for 24-26 hours. Following incubation, 20 microliters of the MTS-PMS solution, prepared just before use, were dispensed in each well and incubated during 120-135 minutes at 37±1 degree Celsius (humidified) in 5 i 1% $CO_2$. The percent viability for the test article was determined from the control blank. A decrease in the number of living cells results in a decrease in the metabolic activity in the sample. This decrease directly correlates to the amount of brown formazan formed, as monitored by the optical density at 492 nm. Cell viability and proliferation was measured using the Celltiter® Aqueous Non-Radioactive Cell Proliferation Assay kit. If the cell viability is reduced to less than 70% of the control blank, a cytotoxic potential exists. The results of Examples 1-4 under such testing is reproduced in Table 3 below.

TABLE 4

Results of Biocompatibility Testing under ISO 10993-5 (24-hour extraction)

|  | Ex. 1 | Ex. 2 | Ex. 3 | Ex. 4 | Negative Control | Positive Control |
|---|---|---|---|---|---|---|
| Weight (g) | 2.22 | 2.21 | 2.21 | 2.21 | n/a | n/a |
| Storage Temp (° C.) | 15-25 | 15-25 | 15-25 | 15-25 | n/a | n/a |

TABLE 4-continued

Results of Biocompatibility Testing under ISO 10993-5 (24-hour extraction)

|  | Ex. 1 | Ex. 2 | Ex. 3 | Ex. 4 | Negative Control | Positive Control |
|---|---|---|---|---|---|---|
| Volume of Article (mL) | 11.1 | 11.1 | 11.1 | 11.1 | n/a | n/a |
| Cell viability | 74.6% | 82.9% | 55.4% | 85.5% | 93.9% | 4.0% |
| Cytotoxic Potential? | No | No | Yes | No | No | Yes |

Examples 5-30

Next, additional samples were fabricated from BioClear having the same part geometry and applying the same procedures for photofabrication, printing, cleaning, and postcuring as described with respect to examples 1-4 above. The procedure for basewashing (with an optional ultrasonic cleaning operation) was performed consistently as explained below with the exception that the base-wash temperature, washing time, and neutralizing agent concentration (the neutralizing agent itself remained sodium bicarbonate for each of examples 5-30) were varied as is indicated in Table 5 below. For each of examples 5-30, the sequence of postprocessing was: (1) photofabrication; (2) cleaning; (3) postcuring; and (4) base-washing, optionally in an ultrasonic bath. Finally, each of the samples was subjected to biocompatibility testing per the same ISO 10993-5 procedure described above with respect to examples 1-4 above. The results are depicted in Table 5 below.

Basewashing with Optional Ultrasonic Cleaning

For the basewashing of examples 5-30, the following procedure was maintained. First, a clean SCHOTT GLS80 AMBER 0.25 L flask was cleaned with IPA and then blow dried with air. Then, a stock solution of the desired concentration (as specified in Table 5 below) of $NaHCO_3$ was prepared in a mixture of water and isopropanol with ratio 64:16 (volume:volume). The stock solution was then stored in a clean Schott bottle. Next, a first flask was filled with 80 ml of the stock solution. The weight of this filled flask was then recorded. After this, a second flask was filled with 80 ml of water. After both flasks were filled, they were preheated to the desired temperature as specified in Table 5 below.

When the flasks were heated fully, the photofabricated aligner was transported to the first flask and gently shaken for the time span specified in Table 5 under the column headed with "washing time." With respect to the samples for which the ultrasonic cleaning method was applied as indicated in Table 5 below, the relevant Schott flasks were place in a gauze basket (to minimize damage to the receptacles during this step) and subjected to an ultrasonic (as opposed to manual) cleaning step. The ultrasonic cleaner was a Branson 5510, with a bath filled with tap water.

After completion of the cleaning, the extract was poured in a small, clean brown glass bottle, whereupon such sample was labelled and stored for further analysis. Next, the aligner was added to the water-filled flask with a pair of clean tweezers and shaken via the same method as the IPA/$H_2O$ extraction for 10 min at the same temperature. Upon completion of this step, the aligner was again removed with clean tweezers, whereupon it was dried with air and stored in a pouch. The aligner was then visually inspected for defects, deformations, salt residues and color, and the water/IPA was visually checked for turbidity. Finally, the aligner number, along with the date and time of the experiment was registered.

TABLE 5

| Example | Neutralizing Agent Concentration (g/l) | Washing Time (min) | Temperature °C. | Ultrasonic cleaning? | Cell viability (%) |
|---|---|---|---|---|---|
| 5 | 1 | 5 | 25 | Yes | 86.0 |
| 6 | 30 | 5 | 50 | Yes | 92.3 |
| 7 | 30 | 30 | 50 | Yes | 91.5 |
| 8 | 1 | 30 | 33.33 | Yes | 86.8 |
| 9 | 1 | 9.09 | 50 | Yes | 87.8 |
| 10 | 1 | 16.51 | 50 | Yes | 91.3 |
| 11 | 30 | 9.09 | 25 | Yes | 70.0 |
| 12 | 30 | 16.51 | 25 | Yes | 91.8 |
| 13 | 3.11 | 30 | 25 | Yes | 88.3 |
| 14 | 5.48 | 5 | 37.5 | Yes | 92.4 |
| 15 | 1 | 5 | 25 | No | 83.7 |
| 16 | 30 | 5 | 25 | No | 84.9 |
| 17 | 1 | 30 | 25 | No | 88.7 |
| 18 | 30 | 30 | 25 | No | 89.8 |
| 19 | 1 | 5 | 50 | No | 87.5 |
| 20 | 1 | 30 | 50 | No | 85.0 |
| 21 | 30 | 5 | 41.67 | No | 99.5 |
| 22 | 30 | 30 | 33.33 | No | 93.8 |
| 23 | 30 | 9.09 | 50 | No | 94.8 |
| 24 | 9.65 | 30 | 50 | No | 93.2 |
| 25 | 1 | 12.25 | 37.5 | No | 82.4 |
| 26 | 5.48 | 12.25 | 25 | No | 82.0 |
| 27 | 5.48 | 12.25 | 37.5 | No | 85.0 |
| 28 | 5.48 | 12.25 | 37.5 | No | 90.8 |
| 29 | 5.48 | 12.25 | 37.5 | No | 81.7 |
| 30 | 30 | 5 | 25 | Yes | 89.4 |

Examples 31-34

Next, four additional samples were fabricated from Bio-Clear by applying the same procedures for photofabrication, printing, cleaning, and postcuring as described with respect to examples 1-4 above. The geometry of example 31 was maintained identically to that of the aligners of examples 1-4. Examples 32-34, meanwhile, were fabricated as spheres of varying sizes as specified in Table 6 below. The procedure for basewashing was similarly maintained with respect to examples 5-30 with the exception that the base-wash temperature, washing time, and neutralizing agent concentration (the neutralizing agent itself remained sodium bicarbonate for each of examples 31-34) was modified as follows:

Concentration of 30 grams per liter of sodium bicarbonate in an IPA/$H_2O$ solution (with a 20:80 ratio by volume of IPA to water, respectively);

Washing time was 5 minutes for each sample;

Washing was conducted at a temperature of 37 degrees Celsius; and

No ultrasonic cleaning process was applied.

The mass, volume, surface area, surface area/volume ratio, and diameter (for spheres only) is reported in Table 6 below. Finally, each of the samples was subjected to biocompatibility testing per the same ISO 10993-5 procedure described above with respect to examples 14 above. The results are depicted in Table 6 below.

TABLE 6

| Example | Mass (g) | Volume (ml) | Surface Area ($cm^2$) | Surface Area/Volume Ratio ($cm^2$/ml) | Diameter (cm) | Cell Viability (%) |
|---|---|---|---|---|---|---|
| 31 | 2.2 | 2.14 | 52.8 | 24.67 | n/a | 99.5 |
| 32 | 2.5 | 2.14 | 8.04 | 3.76 | 1.6 | 89.1 |
| 33 | 16.05 | 14.1 | 28.4 | 2.01 | 3.0 | 87.5 |
| 34 | 74.03 | 65 | 78.5 | 1.21 | 5.0 | 86.5 |

Discussion of Results

As can be seen, the neutralized photofabricated test articles represented by examples 1, 2, 4, and 5-34 showed no cytotoxic potential to L-929 fibroblast cells. Example 3, which was not subjected to the basewashing procedure in the correct sequence as per the present invention, exhibited a reduced cell viability and failed the test. The only difference between example 3 and 4 was the sequence of the post treatment; in example 4, the basewashing occurred after postcuring, whereas in example 3, the basewashing step occurred prior to postcuring. Thus, from the foregoing, it can be concluded that the existence and sequence of the basewashing step is important to improving the biocompatibility performance of the photofabricated article associated therewith.

Examples 5-31 demonstrate that a variety of post-processing procedures can be employed to achieve desirable biocompatibility performance. Specifically, parts exhibit superior biocompatibility performance despite varying levels of neutralizing agent concentration, washing time, washing temperature, and whether the nature of the washing process itself was done via gentle shaking or in an ultrasonic bath.

Finally, examples 31-34 show the relative effect that an article's surface/volume ratio has upon its results in biocompatibility testing, when subjected to the basewashing process of the current invention. These examples show that although parts having a relatively low surface area to volume ratio still pass the test, there is a slight decrease in cell viability with decreasing surface area:volume ratio. Nonetheless, the basewashing surface treatment is sufficient to improve biocompatibility regardless of varying part geometries.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to.") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventor for carrying out the invention. Variations of those preferred embodiments may become apparent to those of ordinary skill in the art upon reading the foregoing description. The inventor expects skilled artisans to employ such variations as appropriate, and the inventor intends for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

While the invention has been described in detail and with reference to specific embodiments thereof, it will be apparent to one of ordinary skill in the art that various changes and modifications can be made therein without departing from the spirit and scope of the claimed invention.

What is claimed is:

1. A method of post-treating a solid photofabricated article created via an additive fabrication process, the method comprising the steps of:
   (1) producing a solid photofabricated article via an additive fabrication process, wherein producing comprises curing a plurality of layers to form the solid photofabricated article;
   (2) after producing the solid photofabricated article, postcuring said solid photofabricated article; and
   (3) after postcuring, base-washing said solid photofabricated article in an alkaline solution or dispersion, thereby creating a neutralized photofabricated article;
   wherein said solid photofabricated article is the cured product of a radiation curable composition that is capable of undergoing cationic and free-radical polymerization, wherein said cationic and free-radical polymerization is performed simultaneously or sequentially.

2. The method of claim 1, wherein the photofabricated article is the cured product of a radiation curable composition or kit of materials comprising, relative to the weight of the entire radiation curable composition:
   (a) from 20 to 90 wt. %, of a cationically polymerizable component;
   (b) from 0.5 to 2.5 wt. % of a cationic photoinitiator;
   (c) from 5 to 40 wt. % of a free-radically polymerizable component;
   (d) from 0.1 to 5 wt. % of a free-radical photoinitiator;
   (e) optionally, an inert solvent; and
   (f) from 0 to 40 wt. % of one or more additives;
   wherein the weight of all components (a) through (f) equals 100%.

3. The method of claim 1, further comprising cleaning the solid photofabricated article, wherein said cleaning step occurs prior to the postcuring or base-washing step; wherein the cleaning step involves immersing the solid photofabricated article in a receptacle filled with a cleaning solution or rinsing the solid photofabricated article with the cleaning solution.

4. The method of claim 3, wherein the cleaning solution comprises a water-soluble alcohol.

5. The method of claim 1, wherein the postcuring step involves a UV postcure of the solid photofabricated article, a thermal postcure of the solid photofabricated article, or both.

6. The method of claim 1, wherein the alkaline solution or dispersion is an aqueous alcoholic solution further comprising a neutralizing agent, wherein the pH of the alkaline solution or dispersion is from 7.1 to 8.5.

7. The method of claim 6, wherein the neutralizing agent comprises NaOH; $Na_2CO_3$; $NaHCO_3$; $K_2CO_3$; $Ca(OH)_2$; magnesium salts; phosphates; triethylamine; pyridine; aliphatic, cycloaliphatic, and organic amines; ammonia; ammonium hydroxide; ammonium or quarternary ammonium salts; or KOH; or mixtures thereof.

8. The method of claim 6, wherein the neutralizing agent is present in a concentration, relative to the entire alkaline solution or dispersion, from 2-50 g/l.

9. The method of claim 8, wherein the aqueous alcoholic solution further comprises water and a water-soluble alcohol.

10. The method of claim 6, wherein the alkaline solution or dispersion is present, in an amount by volume relative to the volume of the solid photofabricated article, in a ratio of greater than 10:1.

11. The method of claim 10, wherein the solid photofabricated article possesses a surface area, a volume, and a surface area to volume ratio, wherein the surface area to volume ratio is greater than about 1 $cm^2$/ml.

12. The method of claim 6, wherein the base-washing step neutralizes a residual acid in the solid photofabricated article, wherein the residual acid comprises hydrofluoric acid, fluoroantimonic acid, fluorophosphoric acid, fluorophenyl boric acid, $BF_3$, $AlCl_3$, $TiCl_4$, $CH_3SO_3H$, or $CF_3SO_3H$.

13. The method of claim 6, wherein the neutralizing agent is present relative to the maximum quantity of generable photoacid species in the radiation curable composition, in terms of molarity, in a ratio.

14. The method of claim 1, wherein the base-washing step involves immersing the solid photofabricated article in a receptacle comprising the alkaline solution or dispersion for at least about 5 minutes.

15. The method of claim 14, wherein, for the duration of the immersing step, the alkaline solution or dispersion is maintained to at least 23 degrees Celsius.

16. The method of claim 1, further comprising the step of cleaning or sterilizing the neutralized photofabricated article; wherein the sterilizing step involves a sterilization technique comprising steaming, superheating, disinfecting, gamma sterilizing, electron beam sterilizing, or ethylene oxide sterilizing.

17. The method of claim 1, wherein the neutralized photofabricated article is a biocompatible article.

18. The method of claim 17, wherein the biocompatible article, when subjected to a cytotoxicity test per ISO 10993-5 at an extraction time of 24±2 hours, exhibits a cell viability above 70%.

19. The method of claim 18, wherein the biocompatible article is a surgical tool, surgical drill guide, dental retainer, dental crown, dental bridge, dental aligner, cranial plate, bending and fitting model, intraoral appliance, splint, pre- and peri-operative model, surgical tool, bracket placement, orthopedic device, medical splint or wafer, or customized patient fluid-contacting device.

20. A method comprising the steps of:
 producing a photofabricated object via an additive fabrication process, wherein producing comprises curing a plurality of layers to form said photofabricated object, and wherein said photofabricated object possesses a residual quantity of an acid or a base;
 after producing the photofabricated object, subjecting the photofabricated object to a postcuring process; and
 after the postcuring process, treating said photofabricated object with a treatment composition possessing a pH and comprising a neutralizing agent to form a neutralized photofabricated object; wherein said neutralizing agent is configured to neutralize at least a portion of the residual quantity of the acid or base.

21. The method of the claim 20, wherein a mathematical sign of a first value derived by subtracting 7.0 from the pH of the treatment composition is opposite of a second value derived by subtracting 7.0 from the pH of the residual quantity of acid or base.

22. The method of claim 21, further comprising postprocessing said photofabricated object via a thermal- or UV-postcure process and/or sterilizing the neutralized photofabricated object.

23. The method of claim 1, wherein postcuring comprises UV postcuring.

* * * * *